US010259164B2

(12) United States Patent
Bader et al.

(10) Patent No.: US 10,259,164 B2
(45) Date of Patent: Apr. 16, 2019

(54) METHODS AND APPARATUS FOR 3D PRINTING OF POINT CLOUD DATA

(71) Applicants: Massachusetts Institute of Technology, Cambridge, MA (US); President and Fellows of Harvard College, Cambridge, MA (US)

(72) Inventors: Christoph Bader, Somerville, MA (US); Dominik Kolb, Kisslegg (DE); Neri Oxman, Cambridge, MA (US); James Weaver, Allston, MA (US)

( * ) Notice: Subject to any disclaimer, the term of this patent is extended or adjusted under 35 U.S.C. 154(b) by 119 days.

(21) Appl. No.: 15/628,635

(22) Filed: Jun. 20, 2017

(65) Prior Publication Data

US 2017/0368755 A1  Dec. 28, 2017

Related U.S. Application Data

(60) Provisional application No. 62/353,045, filed on Jun. 22, 2016.

(51) Int. Cl.
*G06K 9/00* (2006.01)
*B29C 64/386* (2017.01)
(Continued)

(52) U.S. Cl.
CPC ............ *B29C 64/386* (2017.08); *B33Y 10/00* (2014.12); *B33Y 50/02* (2014.12);
(Continued)

(58) Field of Classification Search
None
See application file for complete search history.

(56) References Cited

U.S. PATENT DOCUMENTS

| 6,347,257 B1 * | 2/2002 | Bedal | B29C 41/12 700/118 |
| 6,357,855 B1 * | 3/2002 | Kerekes | B29C 41/12 347/40 |

(Continued)

OTHER PUBLICATIONS

Gurunathan, S.K., et al., Direct layered manufacturing of point sampled objects; published in International Journal of Manufacturing Technology and Management, vol. 6, No. 6, Year 2004.

(Continued)

*Primary Examiner* — Kevin Ky
(74) *Attorney, Agent, or Firm* — Stephen R. Otis

(57) ABSTRACT

An unorganized point cloud may be created by an optical 3D scanner that scans a physical object, or by computer simulation. The point cloud may be converted into binary raster layers, which encode material deposition instructions for a multi-material 3D printer. In many cases, this conversion—from point cloud to binary raster files—is achieved without producing a 3D voxel representation and without producing a boundary representation of the object to be printed. The conversion may involve spatial queries to find nearby points, filtering material properties of the found points, looking up material mixing ratios, and dithering to produce binary raster files. These raster files may be sent to a multi-material 3D printer to control fabrication of an object. A user interface may display a preview of the object to be printed, and may accept user input to create or modify a point cloud.

14 Claims, 9 Drawing Sheets

(51) Int. Cl.
  *G05B 19/4099* (2006.01)
  *B33Y 10/00* (2015.01)
  *B33Y 50/02* (2015.01)
  *B41J 2/21* (2006.01)
  *B29C 64/112* (2017.01)

(52) U.S. Cl.
  CPC ........ *G05B 19/4099* (2013.01); *B29C 64/112* (2017.08); *B41J 2/21* (2013.01); *G05B 2219/32024* (2013.01)

(56) References Cited

U.S. PATENT DOCUMENTS

| | | | |
|---|---|---|---|
| 6,778,295 B1* | 8/2004 | Babulski | G02B 27/2214 358/1.1 |
| 7,023,432 B2 | 4/2006 | Fletcher et al. | |
| 7,305,121 B2 | 12/2007 | Kaufmann et al. | |
| 7,317,456 B1* | 1/2008 | Lee | G06T 15/08 345/427 |
| 7,804,498 B1 | 9/2010 | Graham et al. | |
| 9,600,929 B1* | 3/2017 | Young | G06T 17/00 |
| 2007/0024620 A1 | 2/2007 | Muller-Fischer et al. | |
| 2007/0189564 A1 | 8/2007 | McBagonluri et al. | |
| 2010/0214537 A1* | 8/2010 | Thomas | G02B 27/225 353/7 |
| 2010/0328678 A1* | 12/2010 | Kagermeier | A61B 5/1078 356/601 |
| 2011/0222081 A1 | 9/2011 | Yi et al. | |
| 2012/0213436 A1* | 8/2012 | Grindstaff | G06T 5/008 382/167 |
| 2012/0224755 A1 | 9/2012 | Wu | |
| 2014/0312535 A1 | 10/2014 | Dikovsky et al. | |
| 2015/0294492 A1* | 10/2015 | Koch | H04N 13/243 345/426 |
| 2015/0352872 A1* | 12/2015 | Conrow | B41J 29/393 347/14 |
| 2016/0019319 A1 | 1/2016 | Shtilerman | |
| 2016/0212412 A1* | 7/2016 | Cox | G01B 5/0004 |
| 2016/0282811 A1* | 9/2016 | Urbach | G03H 1/0465 |

OTHER PUBLICATIONS

Liu, G.H., et al., Error-based segmentation of cloud data for direct rapid prototyping; published in Computer-Aided Design, vol. 35, Issue 7, Jun. 2003, pp. 633-645.

LookingGlass, Hologram 2.0 by Looking Glass—Kickstarter; published online in 2014, accessed Jul. 19, 2017 at https://www.kickstarter.com/projects/lookingglass/looking-glass-hologram-20.

Oxman, N., Variable Property Rapid Prototyping; published in Journal of Virtual and Physical Prototyping (VPP), vol. 6, No. 1, pp. 3-31, Year 2011.

Shepherd, P., et al., Rapid Processing of 3D Colour Point Clouds for 3D Printing; published in Proceedings of the International Association for Shell and Spatial Structures (IASS), Symposium 2015, Amsterdam, Future Visions Aug. 2015, Amsterdam, The Netherlands.

Stratasys, Unlocking Innovation, published online in 2015, accessed Jul. 19, 2017 at http://usglobalimages.stratasys.com/Main/Files/Industry%20Brochures/BR_PJ_ED_VoxelPrint_0716a.pdf#_ga=2.147900148.278190438.1500509107-926801279.1473643730.

Wu, Y., et al., Modelling cloud data using an adaptive slicing approach; Computer-Aided Design, vol. 36, Issue 3, Mar. 2004, pp. 231-240.

* cited by examiner

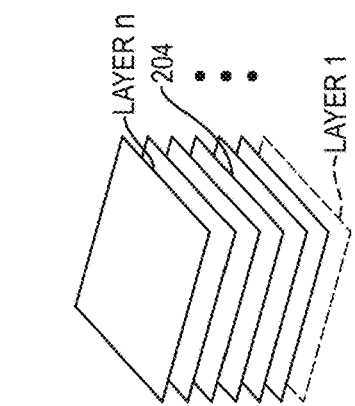
FIG. 2D
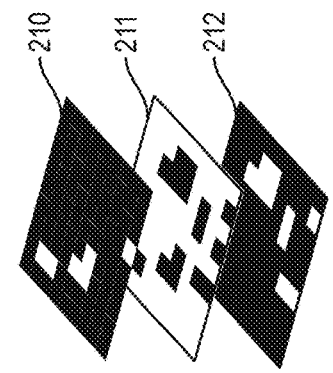
FIG. 2H
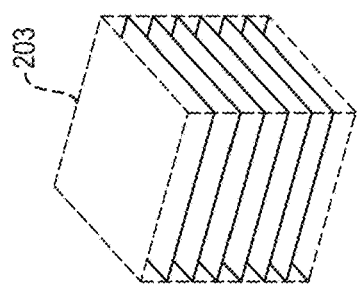
FIG. 2C
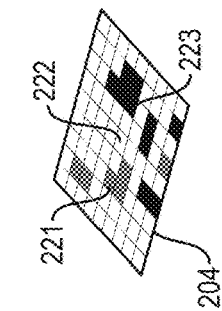
FIG. 2G
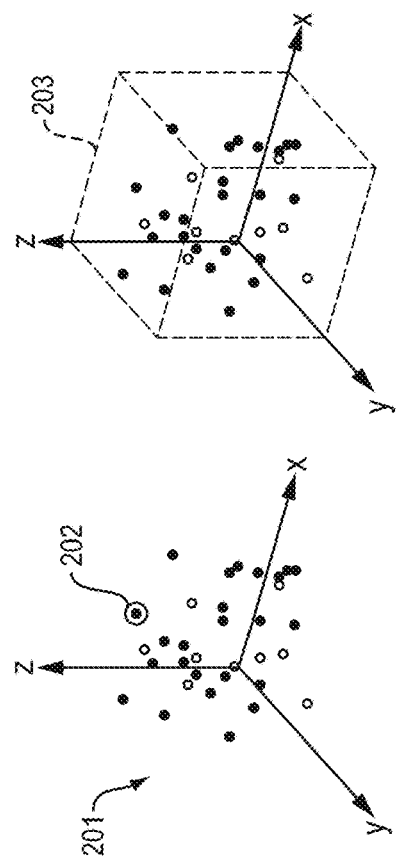
FIG. 2B
FIG. 2F
FIG. 2A
FIG. 2E

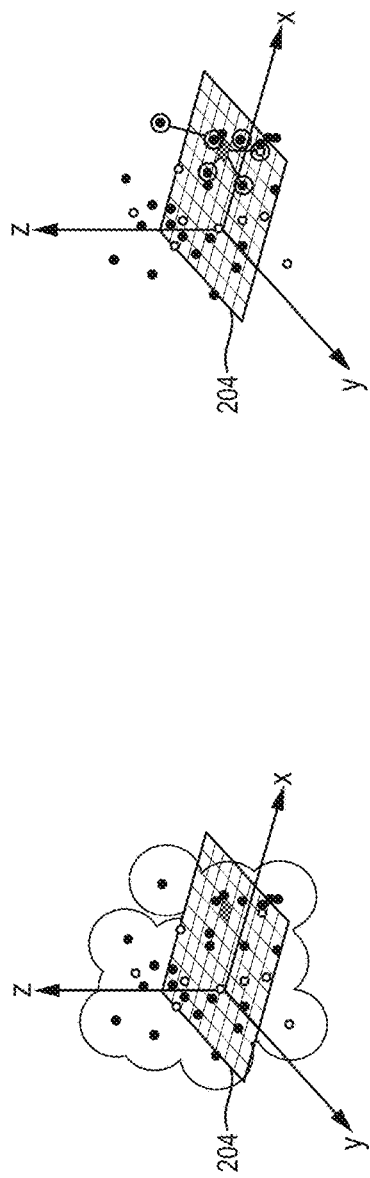
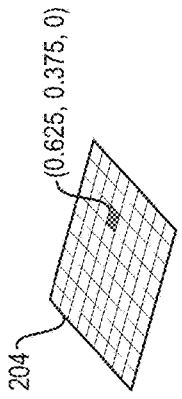
FIG. 3A
FIG. 3B
FIG. 3D
| MATERIAL A | MATERIAL B | MATERIAL C | COLOR | TRANSMITTANCE |
|---|---|---|---|---|
| ... | ... | ... | ... | ... |
| 1 | 0 | 0 | | 0.05 |
| 0.875 | 0.125 | 0 | | 0.05 |
| 0.75 | 0.25 | 0 | | 0.05 |
| 0.625 | 0.375 | 0 | | 0.05 |
| 0.5 | 0.5 | 0 | | 0.05 |
| 0.375 | 0.625 | 0 | | 0.05 |
| 0.25 | 0.75 | 0 | | 0.05 |
| 0.125 | 0.875 | 0 | | 0.05 |
| 0 | 1 | 0 | | 0.05 |
| 0.875 | 0 | 0.125 | | 0.2 |
| ... | ... | ... | ... | ... |
FIG. 3C

METHODS AND APPARATUS FOR 3D PRINTING OF POINT CLOUD DATA

RELATED APPLICATIONS

This application claims the benefit of U.S. Provisional Application No. 62/353,045, filed Jun. 22, 2016 (the "Provisional Application"), the entire disclosure of which is herein incorporated by reference.

FIELD OF TECHNOLOGY

The present invention relates generally to multi-material 3D printing.

BACKGROUND

An unorganized 3D point cloud may represent a 3D object to be printed. The unorganized point cloud may be generated by an optical 3D scanner, by a CAD environment or by a computer simulation.

Each point in the point cloud may be represented by a tuple of data. The tuple for a given point in the point cloud may include data that specifies 3D positional coordinates of the point, and that also specifies properties of the point, such as color (e.g., RGBA), material composition, luminance, opacity, or stiffness.

A multi-material 3D printer may deposit multiple build materials to construct a 3D object by sequentially depositing layers of droplets. The printer may precisely control the spatial positioning of deposition of individual material droplets. Material composition may be controlled at the droplet level by defining—for each deposited build material—a set of layers in a raster-format at the native resolution of the printer. This set of layers, in turn, may define the material identity of the individual droplets and their spatial distribution. For example, the set of layers for a given material may comprise binary material representations in raster file format, defining where droplets of the given material will be deposited. Based on these droplet descriptions, a multi-material 3D printer may print a 3D object that comprises a heterogeneous and continuously varying material composite.

There are conventional approaches for converting an unorganized point cloud into instructions for a multi-material 3D printer.

The two most common approaches involve converting the unorganized point cloud into an intermediate data representation.

In one conventional approach, the intermediate data representation is a boundary representation, such as a 3D mesh of polygons (e.g., an STL file that represents the boundary of an object as a mesh of triangles). In this conventional method: (a) an unorganized point cloud is converted into a boundary representation; and (b) the boundary representation is then converted into instructions for a multi-material 3D printer. Unfortunately, this approach (employing a boundary representation as an intermediate step) is computationally expensive. Furthermore, it causes loss of information and distortion of the shape of the object.

In a second conventional approach, the intermediate data representation is a 3D voxel representation, in which each voxel is a volume that is centered at, or that has a vertex located at (or that is shifted by the same distance in the same direction from), a grid point in a regularly-spaced 3D grid. In this second conventional method: (a) the unorganized point cloud is converted into a 3D voxel representation; and (b) this 3D voxel representation is then converted into instructions for a multi-material 3D printer.

Unfortunately, this second approach tends to be impractical due to the extremely massive dataset needed to describe a large multi-material object by a 3D voxel representation at the native resolution of a typical multi-material 3D printer. For example, a Stratasys® J750 3D Printer is a multi-material 3D printer, has a layer thickness of 12 microns for many build materials, and has a build resolution of: x-axis 600 dpi, y-axis 300 dpi, z-axis 2117 dpi. At this native resolution (which is in the approximate range of many multi-material 3D printers), the amount of data required for a 3D voxel representation of a large (e.g. more than 40 cm×30 cm×20 cm), multi-material object would typically be massive. Indeed, the dataset would typically be so large that it would be impractical in most real-world scenarios, either due to insufficient memory or massive computational load resulting in very slow processing.

Thus, a technological problem exists: how to convert an unorganized point cloud into instructions for multi-material 3D printing, in a manner that is computationally efficient and that does not distort the shape of the object being printed.

SUMMARY

In illustrative implementations, this invention solves this technological problem: it converts an unorganized point cloud into printer instructions for a multi-material 3D printer, in a manner that is computationally efficient and that does not distort the shape of the object being fabricated.

In illustrative implementations of this invention, the intermediate data structures discussed above are not generated during the conversion process (which converts an unorganized point cloud into printer instructions). That is, in illustrative implementations, this conversion process does not include creating a boundary representation or a 3D voxel representation. As a result, this invention may avoid the computational inefficiencies, massive data storage and slow processing that may attend these two intermediate representations.

Instead, in illustrative implementations of this invention, the data in the unorganized 3D point cloud may be converted into binary raster files for 3D printing an object, as follows:

A hull that encloses all or part of the point cloud may be selected. The hull-enclosed point cloud may be computationally divided into layers. Each of these the layers may be computationally divided into pixels. The hull-enclosed point cloud may be organized into a spatial data structure (e.g., binary space partition tree, kD tree, or R-tree), which facilitates efficient spatial queries of the point cloud. For each pixel in a layer, a spatial query may be performed to find up to a maximum number of points in the point cloud that are nearest to the pixel and that are within a specified distance from the pixel. The points that are returned by the spatial query are sometimes referred to herein as "found points".

In illustrative implementations, for each pixel, material property data for the found points may be filtered (e.g., by weighting data from nearer points more than data from more distant points) to produce a filter output for the pixel. For example, the value(s) for the pixel that are outputted by the filter may comprise the pixel's color, or elastic modulus, or both. Then for each pixel, respectively, in a layer, the filtered output for the pixel may be mapped to a material mixing ratio for the pixel. For each example, if the filter output for a pixel is a given color, a computer may determine relative proportions of different colored resins that together produce the given color.

For a 3D printer that deposits m materials to print the object, the material mixing ratio for a pixel may be stored as an m-dimensional vector, where each element in the vector is a relative proportion of a material. The material mixing ratios for pixels in a layer may be dithered to create m binary raster files for that layer, one raster file for each material to be printed. The binary raster file for a given material in a layer may specify, for each pixel in the layer, whether or not the given material is to be deposited at that pixel. The resolution of the binary raster files may be the same as the native resolution of the printer.

As used herein, a "PC-to-BRF conversion" means conversion of an unorganized point cloud into binary raster layers that encode material deposition instructions.

In illustrative implementations, a PC-to-BRF conversion is performed layer-by-layer, one layer at a time. For example, the spatial queries, filtering, mapping, and dithering described above may be performed layer-by-layer, one layer at a time. For example, the spatial queries, filtering, mapping, and dithering may be performed for all the pixels in a first layer, then for all the pixels in the next layer, and so on.

In illustrative implementations, an advantage of performing the PC-to-BRF conversion layer-by-layer—one layer at a time—is that much of the data that is generated (during the conversion) regarding a layer may be deleted before the next layer is processed, thereby reducing the amount of digital memory needed. For example, the following data regarding a layer may be deleted as soon as use of that data is completed (and in any event after the binary raster files for the layer are generated): (a) the identity of found points for pixels in the layer; (b) distance calculations for pixels in the layer; (c) values (e.g., color) outputted by a filter regarding pixels in the layer; and (d) material mixing ratios for pixels in the layer. Furthermore, the binary raster files for a given layer may be deleted, after the layer is printed. Indeed, the binary raster files for a given layer may be deleted from the digital memory for a computer even before the layer is printed, if the binary raster files for the layer have already been sent from the computer to the 3D printer that processes these files to control printing for that layer. In illustrative implementations, which dithering method is used may affect how long data regarding a layer is stored. For example, in some cases, a dithering method is employed, in which data regarding the next k layers and the previous k layers is used for dithering, where k is much smaller than the total number of layers.

In illustrative implementations of this invention, a user may add, modify or delete data in (a) a point cloud, (b) a spatial data structure, (c) a material properties database or look-up table, or (d) a binary raster file that encodes material deposition instructions. Among other things, a user: (a) may select a hull to enclose a point cloud; (b) may modify data associated with one or more points or pixels (e.g., by changing material properties); or (c) may perform global operations on data associated with points or pixels, such as by applying a filter. In addition, in illustrative inventions, a user may view a visualization of all or part of the point cloud data.

This invention has many practical applications. For example, this invention is well-suited for reconstructing, with great precision, a cultural or archeological artifact from an unorganized point cloud created by an optical 3D scanner. This is because, in illustrative implementations, this invention does not employ a boundary representation as an intermediate step in the PC-to-BRF conversion process, and thus avoids the loss of information and distortion of shape that would be caused by producing a boundary representation.

Furthermore, this invention is well-suited for 3D printing of large composite objects that comprise many materials (e.g., with continuous material property gradients). This is because, in illustrative implementations, this invention does not employ a 3D voxel representation as an intermediate step. Thus, in illustrative implementations, this invention avoids the massive dataset that would be needed to describe a large, multi-material object by a 3D voxel representation at the native resolution of a typical multi-material 3D printer.

More generally, this invention is well-suited for 3D printing any multi-material 3D object, large or small. This is because, in illustrative implementations, this invention converts—in an accurate and computationally highly efficient manner—an unorganized 3D point cloud into binary raster files that comprise instructions for a 3D printer.

The Summary and Abstract sections hereof: (a) do not limit this invention; (b) are intended only to give a general introduction to some illustrative implementations of this invention; (c) do not describe all the details of this invention; and (d) merely describe non-limiting examples of this invention. This invention may be implemented in many other ways. Likewise, the description of this invention in the Field of Technology section is not limiting; instead it identifies, in a general, non-exclusive manner, a field of technology to which some implementations of this invention generally relate.

BRIEF DESCRIPTION OF THE DRAWINGS

FIGS. 2A, 2B, 2C, 2D, 2E, 2F, 2G and 2H together show steps in a method of converting an unorganized point cloud into binary raster files that provide instructions for 3D printing. In FIG. 2A, an unorganized point cloud is created. In FIG. 2B, a hull for the point cloud is determined. In FIG. 2C and FIG. 2D, the point cloud is enclosed in the hull and the dimensions of the layers are determined. In FIG. 2E, FIG. 2F and FIG. 2G, the layers are processed, layer by layer, a spatial query is performed for each pixel in each layer, and material properties for each pixel in each layer are determined. In FIG. 2H, the material mixing ratios of pixels in a layer are dithered to produce a set of binary raster files for that layer, one raster file per print material loaded in the 3D printer.

FIGS. 3A to 3D together show steps in a method of determining a material mixing ratio for a pixel. In FIG. 3A, a spatial query is performed. In FIG. 3B, filtering is performed. In FIG. 3C, a lookup table is consulted to determine a material mixing ratio. In FIG. 3D, a material mixing ratio is assigned to a pixel.

The above Figures show some illustrative implementations of this invention, or provide information that relates to those implementations. The examples shown in the above Figures do not limit this invention. This invention may be implemented in many other ways.

DETAILED DESCRIPTION

In illustrative implementations of this invention, a multi-material 3D printer may print a 3D object, based on data stored in an unorganized 3D point cloud. The point cloud may comprise data regarding a set of points. The data associated with each point may specify (a) spatial coordinates of the point, and (b) other properties such as color, material properties, hardness, Young's modulus, opacity, or luminance.

In illustrative implementations, the unorganized point cloud may be generated by a 3D optical scanner that scans an object to be printed. Alternatively, the unorganized point cloud may be generated by a CAD environment or a computer simulation of an object.

In illustrative implementations, the points in the unorganized point cloud are not constrained to positions at the intersections of grid lines of a regularly-spaced 3D grid, but rather may occupy any position within the point cloud. Advantageously, in some cases, the number of points in the point cloud representation of an object may be much less than the number of voxels in a 3D voxel representation (in which each voxel is positioned at a grid intersection of a regularly-spaced 3D grid).

In some implementations of this invention, a multi-material 3D printer deposits UV-curable droplets of photopolymer resin in a layer-by-layer manner. The droplets may be deposited by jetting them from nozzles, similar to the manner of deposition in an inkjet printer. By spatially varying the droplet density of different materials during fabrication of a 3D printed object, material concentration gradients may be achieved in the fabricated object. These density values may be specified as sets of layers in a raster file format at the native resolution of the printer. One set of binary raster files may be generated for each material, respectively, that is being deposited by the printer. Each binary raster file may comprise a description for a given print layer and for a given print material, such that, for each pixel in the layer, respectively, the binary raster file instructs a 3D printer to deposit or to not deposit that print material at the pixel's location. This droplet deposition description may then be used by the printer to fabricate objects with precisely defined material mixtures (for example, to fabricate parts with approximately continuous gradients in transparency, such as from opaque to clear—or in elastic modulus, such as from stiff to soft.)

Figure 1:
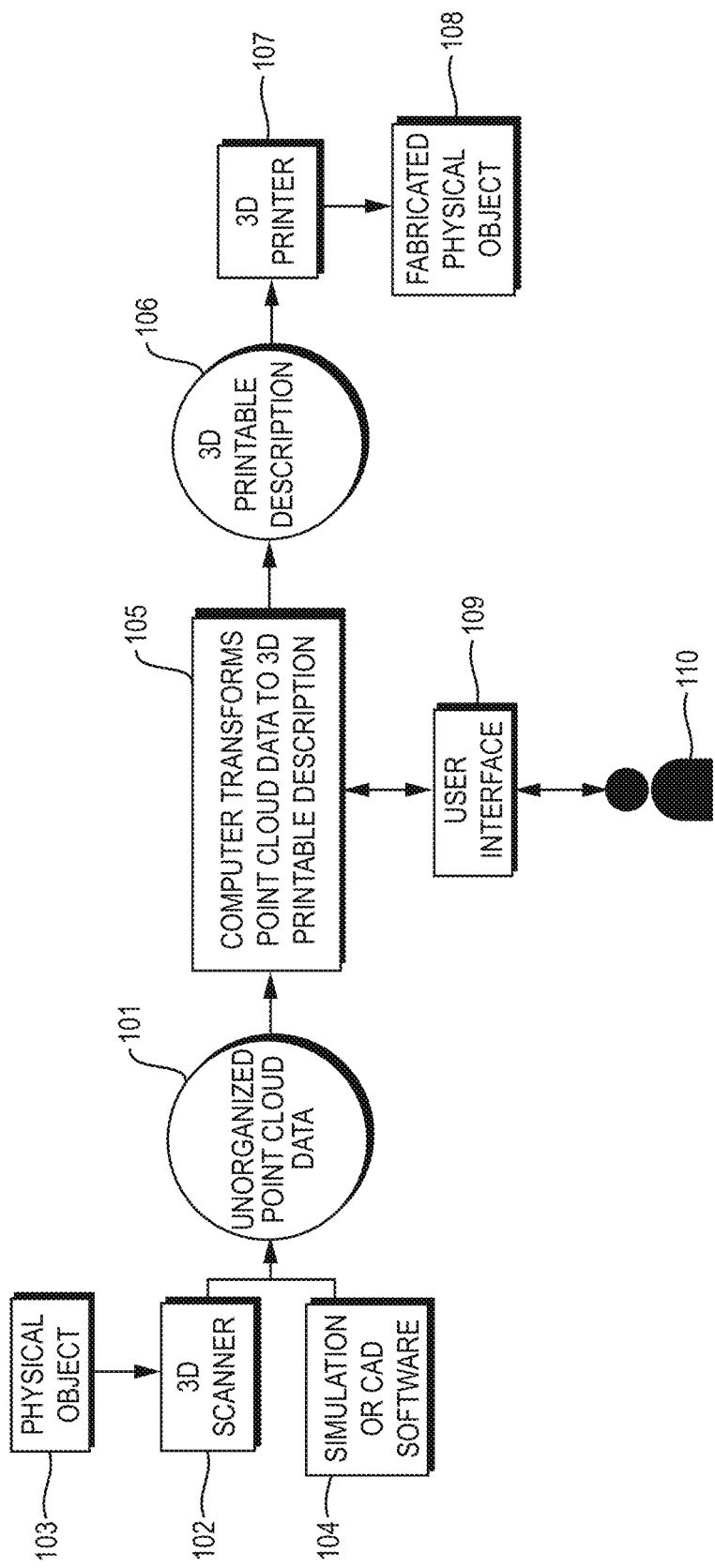
FIG. 1 is a conceptual diagram for a method of creating an unorganized point cloud, and then 3D printing an object based on data in the point cloud.

FIG. 1 is a conceptual diagram for a method of creating an unorganized point cloud, and then 3D printing an object based on data in the point cloud, in an illustrative implementation of this invention. In the example shown in FIG. 1, an unorganized point cloud 101 may be produced (a) by a 3D optical scanner 102 scanning a physical object 103, or (b) by a computer executing CAD software or performing a simulation to generate data 104. A computer may perform a PC-BRF conversion (converting the point cloud to binary raster files) 105 and may output a description 106 of the object to be printed. The outputted description may comprise binary raster files. Based on the binary raster files, a computer may generate instructions for a multi-material 3D printer 107 to fabricate a physical object 108.

In the example shown in FIG. 1, a computer may control one or more input/output devices 109 (such as a display screen, touch screen, keyboard, microphone, mouse, speaker or microphone). One or more of these I/O devices may display or otherwise present a visual or audio user interface. The user interface may display a visualization of the point cloud, and may accept user input to modify or process the point cloud, such as user input (a) that selects a portion of the point cloud to be enclosed by a hull, or (b) that comprises instructions for adding, deleting or modifying data in the point cloud. In some cases, all or any portion of the workflow described in FIG. 1 may be performed automatically, without input from a human user. For example, a computer may perform a PC-BRF conversion (from point cloud to binary raster files), in such a manner that once the hull enclosure for the point cloud is selected, the computer automatically performs the PC-BRF conversion without any further human input during conversion itself.

In the example shown in FIG. 1, a computer may perform calculations to convert the unorganized point cloud into a set of material deposition descriptions for multi-material 3D printer. The unorganized point cloud may comprise data representing a set of points with associated properties such as 3D position and material properties (e.g. RGBA color, material composition or luminance).

In some implementations of this invention, a user may make changes to data associated with one or more points or pixels before, at any stage of, or after, a PC-BRF conversion. For example, a user may modify: (a) data that is associated with a point in an unorganized point cloud, (b) data that is associated with a point in a spatial data structure generated from the point cloud, (c) data that specifies material properties associated with a pixel, (d) data that specifies a material mixing ratio for a pixel, or (e) data that specifies material deposition instructions in a binary raster file. For example, a user may provide input that comprises instructions to: (a) add or delete a point; (b) modify, add, or delete data associated with a point or pixel, such as data that specifies material properties associated with a point or pixel; (c) assign material information; (d) specify the shape, size and location of a hull to enclose all or a portion of an unorganized point cloud; (e) apply a local or global filter, including a smoothing filter or a filter that disregards outlier values; or (f) perform an operation that globally affects all or a subset of points or pixels. Each of these user-inputted instructions may specify an operation on one or more points or pixels. Furthermore, via the user interface, the user may load and visually preview data (e.g., data in an unorganized point cloud) such that the displayed visualization resembles the physical object to be printed.

The material droplet descriptions may specify a set of layers in a raster file format. A binary raster file may specify in a binary fashion, for each pixel in a layer, whether or not the given material will be deposited by the 3D printer at the pixel's position. The raster image resolution may be identical to the native resolution of the 3D printer. The computer may generate, from the unorganized point cloud, multiple binary raster files for each print material loaded in the 3D printer, such that there is one binary raster file for each print material for each layer. For example, if the 3D printer prints a composite object by jetting six different print materials and there are 1,000 layers, then a computer may generate 6,000 binary raster files (1,000 for each print material, 6 for each layer).

In some implementations of this invention, a 3D printer prints a composite object comprising multiple photo-polymeric materials. For example, in some cases, the 3D printer deposits cyan, magenta, yellow, black, white and transparent resins, and is configured to print any color in a full color model, by controlling the deposition of these colors of resin.

In some implementations, a 3D printer deposits both colored resins and a transparent resin. After being deposited and cured, the colored resins may form an opaque solid object and the transparent resin may at least partially surround the opaque object. For example, the transparent resin may be employed to fabricate a solid, transparent region that encloses an opaque 3D printed object (e.g., such that the opaque object is embedded inside a transparent, solid cuboid). In some cases: (a) a set of multiple opaque objects may be printed, each based on data from a separate point cloud; and (b) the transparent resin may surround these objects, such that these objects are embedded together in a single transparent object. Thus, in some cases, data from multiple unorganized point clouds may be employed to control fabrication of a single physical object, with or without combining or altering the point clouds themselves. This may facilitate physical visualization of unconnected and unorganized datasets without modification.

In some implementations: (a) visual material properties such as transmittance, attenuation or index of refraction of material compositions may be measured and recorded; and (b) a computer may, based on this recorded data, accurately render a preview of the point cloud data before printing.

In some implementations, binary raster files (which contain droplet deposition descriptions) may specify approximately continuously varying material properties in the object to be printed. Objects with intermediated material properties may be measured to collect data of the defined intermediated material compositions. This data may be used as parameters in a BSDF-based shading model to facilitate the accurate rendering and pre-visualization of the object.

In some implementations, a human user may provide input that specifies a desired material property (e.g., a particular opacity). Based on this input: (a) a user interface may display a visualization of the object with this desired material property, and (b) a computer may modify stored data regarding material composition of the object to be printed (and thus may modify the material properties of an object to be printed).

In some implementations, a computer may—based on the dimensions of the enclosing hull that is selected, and based on the native resolution of the 3D printer—determine the number of layers that will be deposited to fabricate the desired 3D object FIGS. 2A, 2B, 2C, 2D, 2E, 2F, 2G and 2H together show steps in a method of converting an unorganized point cloud into binary raster files that provide instructions for 3D printing, in an illustrative implementation of this invention.

In the example shown in FIG. 2A, an unorganized point cloud 201 is created. Each point (e.g., 202) in the point cloud, respectively, may be represented by a set of data that specifies 3D spatial coordinates of the point and that specifies other attributes (e.g., material properties) associated with the point.

In the example shown in FIG. 2B: a hull 203 is specified. The hull encloses all or part of the unorganized point cloud. In most applications: (a) the points in the region of the point cloud that is enclosed by the hull are the only points that are taken into account, when creating instructions for the 3D printer; and (b) any points in the point cloud that are outside the hull are disregarded, when creating instructions for the 3D printer. A computer may determine the hull automatically (e.g., by minimizing one or more dimensions of the hull, subject to one or more constraints, such as enclosing all the points in the point cloud or enclosing a particular subset of the points, such as a subset which represents one or more objects). Alternatively, a computer may determine the hull based on input from a human user that specifies the size, shape and position of the hull, and that thus selects the region of the point cloud that will be enclosed by the hull. The hull that is selected (by a computer either automatically or based on human input) may enclose all or only a portion of the point cloud. In many implementations: (a) all edges of the hull are aligned with the Cartesian axes of the spatial coordinates; and (b) the hull specifies the exterior surface of a cuboid. Alternatively, the hull may specify the exterior surface of any polyhedron, sphere, ellipsoid, or other 3D geometric shape. For example, the hull may be a convex hull of one or more point clouds or may be a bounding box. If the multi-material printer prints a transparent material, in addition to other materials, then the hull may define the exterior surface of a transparent solid region that will surround an opaque solid object when printed.

In the example shown in FIG. 2C and FIG. 2D, a computer encloses the point cloud in a hull. The computer may computationally divide the hull-enclosed portion of the point cloud into layers, and may computationally divide each layer into pixels. The computer may also determine the number of layers to be printed, the x, y dimensions of each layer, and x, y, z resolution. This determination may be based on (a) the dimensions of the enclosing hull, (b) the native resolution of printer (in x, y, and z dimensions), and (c) the 3D printer's build envelope. The distance of each layer may be equal to the minimum z-step of the 3D printer. Alternatively, the distance of each layer may be equal to a distance, which is greater than or equal to the minimum z-step of the 3D printer and is less than or equal to the maximum z-step for the printer.

In the example shown in FIGS. 2E, 2F and 2G, the layers (e.g., 204) are processed, layer by layer. While a given layer is being processed: (a) a spatial query is performed for each pixel inside the hull in the layer; and (c) material properties for each pixel inside the hull in the layer are determined. A spatial query for a pixel (e.g., pixel 209) may determine the up to n points in the point cloud that are nearest to the pixel and that are within a specified distance threshold from the pixel, where n is maximum number of points permitted to be found (in the spatial query) for a given pixel. The region that falls within the distance threshold for a pixel may comprise a sphere (e.g., 220), where the origin of the sphere is located in the pixel.

As noted above, points that are returned by a spatial query are sometimes referred to herein as "found points".

In some implementations, if a pixel is not inside the hull, then the pixel may be specified as either: (a) a pixel at which no material is to be deposited during 3D printing; or (b) a pixel at which a support material is to be deposited during the 3D printing, and then later removed. Alternatively, if a pixel is inside the hull and if the spatial query returns no found points for a pixel within the hull, then the pixel may be assigned (e.g., by interpolation) material properties, based on the material properties determined for nearby pixels. For this purpose, any conventional interpolation method may be employed, such as nearest neighbor interpolation, bilinear interpolation, or bicubic interpolation. Alternatively, in some cases, if the spatial query returns no found points for a pixel inside the hull, then the pixel may be specified as a pixel at which transparent resin is to be deposited during 3D printing. The effect of printing transparent resin for outer pixels may be to create a transparent outer region of the printed object, so that an opaque object in the interior of the printed object is embedded inside the transparent outer region.

In some implementations: (a) a radius is associated with each point in the point cloud; and (b) if the distance between the point and a given pixel is greater than the radius associated with the point, then that point will not be treated as a found point for the given pixel. As a non-limiting example, consider a scenario in which: (a) a radius is associated with each point in the point cloud; (b) the distance threshold for a spatial query is 0.5 mm; (c) the radius associated with a given point in the point cloud is 0.1 mm; (d) the point is 0.2 mm from the pixel; and (e) the point is the nearest point to the pixel. In some cases, a computer would not—in that scenario—treat the point as a found point, because the point-to-pixel distance (0.2 mm) exceeds the radius associated with the point (0.1 mm).

In illustrative implementations of this invention, the spatial query may be efficiently implemented using any conventional spatial data structure. In some cases, an advantage of using a spatial data structure is localization of data in regions or clusters, which may be stored in physical memory on a single page or disk block. In a spatial data structure, space may be hierarchically partitioned or grouped according to distribution of the points. Each node at the lowest hierarchy level of the spatial data structure may contain none, one or more points of the point cloud. The organization of the data structure may facilitate efficient searches for a point through the hierarchy of partitions.

Thus, in illustrative implementations, a computer may convert an unorganized point cloud into a spatial data structure. The spatial data structure may employ any conventional spatial indexing method to facilitate efficient spatial queries. For example, the spatial data structure may comprise a BSP-tree (binary space partition tree), a kD-tree, R-tree, R+ tree, R* tree, Hilbert R-tree, B-tree, B+ tree, Z-ordering, quadtree, octree, X-tree, UB-tree, or m-tree. For example, in some cases, the spatial data structure that is employed is BSP-tree, in which: (a) points are hierarchically sorted by half-spaces; (b) two half-spaces are recursively divided into half-spaces until a specified number of points is contained in a single half-space. For example, in some cases, during a spatial query using a BSP-tree, a computer may: (a) check whether the provided spatial indexing position is within a half-space; and (b) if the index is within a half-space, then search the next lower hierarchy level (and so on, down to the lowest hierarchy level). A spatial query using a BSP-tree may end when the target number of nearby points is found, or when the lowest level of the hierarchy has been completely searched, whichever happens first.

In illustrative implementations, which type of distance (nearness) is calculated (e.g. in a spatial query) may vary. For example, it may depend on which spatial data structure or spatial indexing is employed in a particular implementation of this invention. Any measure of distance that is appropriate for the spatial data structure may be utilized (e.g. to determine which points are nearest to a pixel). For example, in some cases, the distance metric may be an L2 distance (Euclidean length), or an L1 distance (taxicab distance).

As noted above, a spatial query may return found points.

In illustrative implementations, data representing material properties is associated with each found point. The material information of the found points may describe color, opacity, stiffness or any other material property. This material information may be included in the point cloud by the original data acquisition process (e.g., by optical scan or by computer simulation), or may be added or modified through editing of the point cloud (e.g., based on input from a user).

In illustrative implementations, a computer filters data representing the material properties for the found points for a given pixel, and then data outputted by the filter ("filter output") is mapped to a material mixing ratio for the pixel. This filtering and mapping may be done in many different ways.

For example, in some cases, a computer filters material properties of the found points for a pixel, based on the distance between the pixel and each of the found points, respectively. For example: (a) the filter may comprise distance weighted averaging; and (b) data associated with found points that are nearer to the pixel may be weighted more heavily than data associated with found points that are farther from the pixel. Alternatively, or in addition, any other type of filter—such as low pass, bandpass, high pass, or gaussian filtering—may be employed to filter the material properties associated with the found points for a pixel. For example, the value(s) for a pixel that are outputted by the filter may comprise the pixel's color, or elastic modulus, or both.

The filter output for a pixel may then be mapped to material mixing ratio for the pixel. For example, if the filter output for a pixel is a given color, a computer may determine relative proportions of different colored resins that together produce the given color.

In some cases: (a) the mapping of each filter output (e.g., color) to a material mixing ratio may be determined in advance and stored in a look-up table; and (b) a computer may compare the filter output (e.g., color) for a pixel to the lookup table, in order to determine the material mixing ratio for the pixel.

In illustrative implementations, a material mixing ratio for a pixel may be represented by an m-dimensional vector, where m is the number of vector components and m is equal to the number of print materials deposited by the printer during the fabrication. The sum of all the vector components may be equal to 1.

As used herein, a "material mixing ratio" is an ordered set of numbers that specifies relative proportions of materials. As a non-limiting example, consider a scenario in which: (a) the printer prints three materials (material A, material B, and material C); (b) the relative proportions of materials A, B and C associated with a given pixel are 0.625, 0.325 and 0, respectively; and (c) the material mixing ratio for the pixel is 0.625, 0.325, 0. In this example, the material mixing ratio for the pixel may be represented by a vector with three components, specifically, the vector [0.625 0.325 0].

In the example shown in FIG. 2H, the material mixing ratios of pixels (e.g., 221, 222, 223) in a layer (e.g., 204) are dithered to produce a set of binary raster files (e.g., 210, 211, 212) for that layer. In illustrative implementations, for any given layer, there is one raster file per print material. In illustrative implementations: (a) there are m binary raster files for each layer, where m is the number of materials that are loaded in the 3D printer; (b) each binary raster file encodes deposition descriptions for only a single print material; and (c) each pixel in a binary raster file specifies whether or not the print material will be deposited in the build location that corresponds to that pixel.

In illustrative implementations, the material mixing ratios for pixels in a layer are dithered, in order to produce the binary raster files. In the example shown in FIG. 2H, a white pixel denotes that the material described by the binary raster file will be deposited at the build location that corresponds to the pixel, and a black pixel denotes no deposition of that material at that build location.

In illustrative implementations, the spatial queries, filtering, mapping, and dithering described above may be performed layer-by-layer. For example, the spatial queries, filtering, mapping, and dithering may be performed for all the pixels in a first layer, then for all the pixels in the next layer, and so on.

FIGS. 3A to 3D together show steps in a method of determining a material mixing ratio for a pixel, in an illustrative implementation of this invention. In FIG. 3A, a spatial query is performed. In FIG. 3B, filtering is performed. In FIG. 3C, a lookup table 301 is consulted to determine a material mixing ratio (e.g., 302) for a pixel. For example, mixing ratio ratio 302 may be represented by the vector [0.625 0.325 0]. In FIG. 3D, a material mixing ratio is assigned to a pixel 209.

In the example shown in FIGS. 3A to 3D: (a) a current pixel (e.g., pixel 209) and its spatial position are determined; (b) the position and a user-defined distance threshold (radius) is used as a spatial index into the point cloud to find the up to n nearest neighboring points within this radius. The information from these found points may be filtered (e.g., by distance weighted averaging, by choosing the maximum/minimum value, or by median filtering). One or more material properties outputted by the filter (filter outputs) may then be used to perform a look up into a material information database. For example, a filter output for a pixel may be the color of the pixel. A look-up table may store, for each respective filter output (material property), the material mixing ratio of 3D printable resins that would create this respective material property. This material mixing ratio may be represented by an m-dimensional vector (where m equals the number of materials being printed by the 3D printer). The material mixing ratio may then be assigned to the pixel.

For each given layer, the material mixing ratios for the layer may be dithered into the material droplet deposition descriptions in the form of the binary raster files. One bitmap raster file may specify the spatial region in the build envelope of the 3D printer where material of a given material type should be deposited. A "0" in the bitmap may indicate no deposition of the given material whereas a "1" may indicate deposition of given material. The bitmap-files (binary raster files) may then be sent to the printer to instruct it to build an object accordingly.

This process (of creating a set of binary raster files for each layer) may be performed, layer-by-layer for all layers in the hull-enclosed point cloud. The layers may be generated at machine-dependent vertical layer deposition heights (for example at every 12 microns) from lowest to highest positions. After the last layer is processed, and the material deposition instructions have been sent to the printer, a physical object may be additively manufactured.

Figure 4:
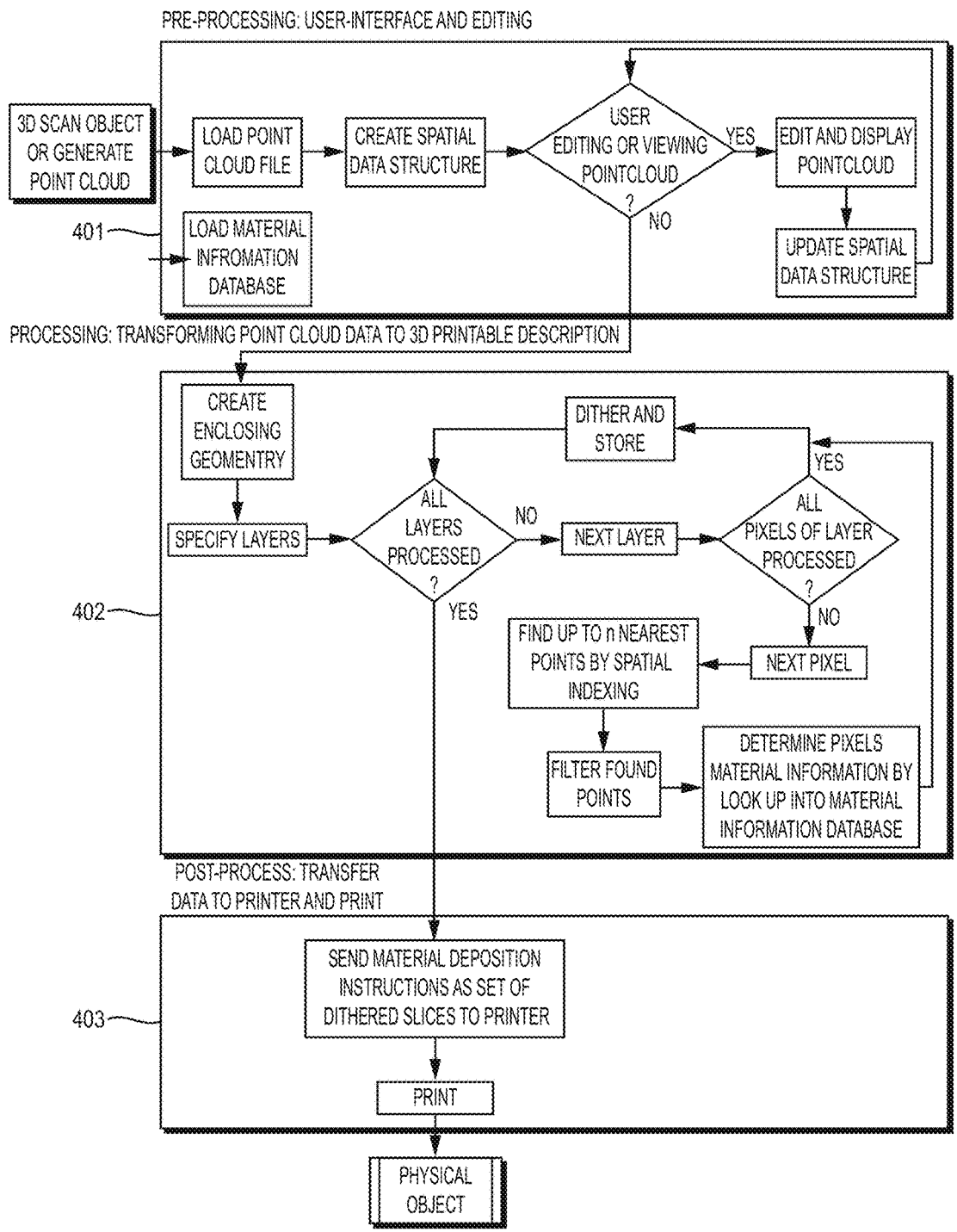
FIG. 4 is a flowchart for a method of 3D printing from an unorganized point cloud.

FIG. 4 is a flowchart for a method of 3D printing from an unorganized point cloud, in an illustrative implementation of this invention. The workflow may comprise three parts: pre-processing 401, processing the point cloud into material deposition instructions 402, and post-processing 403. During pre-processing 401, a user may load, edit and display a point cloud. During pre-processing 401, any point-cloud format may be loaded. Upon program start, a material information database may be loaded as well. A spatial data structure may be generated, in order to organize the point cloud to facilitate efficient spatial queries. A user may edit the point cloud. For example, a user may (a) associate additional properties to the points which may be used in the processing workflow (for example radius and opacity of the points), or (b) change the positional arrangement of the points, such as by adding or deleting points or by making other modifications. The user may also display and preview the dataset to get an impression of how the final print may look like. For previewing, an initial enclosing may be generated and displayed as a transparent hull. The preview rendering may query the material information database to find material properties, such as attenuation and transmittance, which may be used in a shading model to preview the transparent and semi-transparent object. During processing 402, the point cloud may be processed to generate the material deposition description. Layers may be generated at machine-dependent layer deposition heights. The layers may be processed, layer-by-layer. For each pixel inside the generated hull in a layer, a spatial query may find up to a specified number of points in the point cloud that are within a threshold distance from the pixel (found points). For each pixel, the material properties associated with the found points for the pixel may be filtered, and the output of the filter (e.g., a color) may be mapped to a material mixing ratio for the pixel. For each layer, material mixing ratios for pixels in the layer may be dithered into separate bitmaps, such that there is one bitmap per layer per print material. Each bitmap may be a binary raster file. Each bitmap may control printing of a given material for a given layer, by specifying for each pixel in the layer whether or not to deposit the material at the location (in the printer's 3D build region) which corresponds to the pixel.

Figure 5:
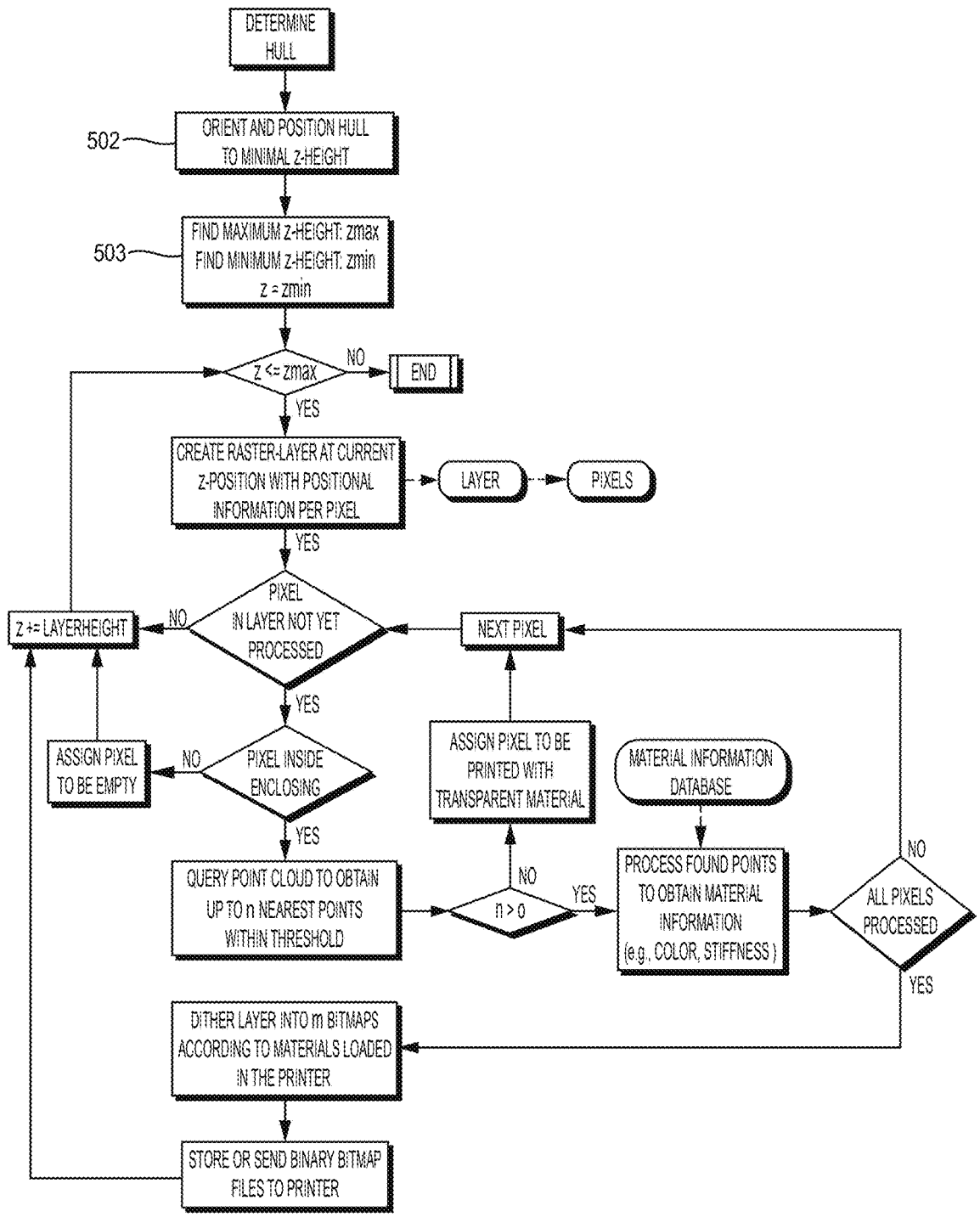
FIG. 5 is another flowchart for a method of 3D printing from an unorganized point cloud.

FIG. 5 is another flowchart for a method of 3D printing from an unorganized point cloud, in an illustrative implementation of this invention. An enclosing hull may be generated and oriented (e.g., in such a manner as to minimize z-height of the hull 502). Layers may be created, one layer for every z-height increment of the printer 503. The layers may be processed, one layer at a time. Each pixel in the layers may have spatial coordinates. The spatial coordinates of a pixel may be used to spatially query the point cloud to find up to a maximum number of points in the point cloud that are within a threshold distance from the pixel. If points are found, their material information may be filtered and mapped (e.g., according to user-defined function(s)). The filtered value(s) for a pixel may be used as look up key(s) to the material information database, in order to determine a material mixing ratio for the pixel. The material mixing ratios for pixels in a layer may be dithered to binary raster files (bitmaps), such that, for any given layer, there is one bitmap per material loaded in the printer. This spatial querying, filtering, mapping and dithering may be performed layer-by-layer, until all the layers are processed. In some cases, after bitmaps have been generated for each layer, the bitmaps may be sent to a 3D printer. The 3D printer may fabricate a physical object in accordance with the material deposition information in the bitmaps.

In illustrative implementations, any conventional software may convert the binary raster files (which encode material deposition instructions) into printer-level instructions that control operation of the 3D printer. For example, the printer-level instructions may control actuators that actuate movement of a printhead, and may control the operation of the printhead, valves or pumps (e.g., to control whether material is jetted from a given nozzle at a given time and to control which material is jetted from a given material at a given time). For example, the binary raster files may be converted to G-codes to control operation of the 3D printer, or may be converted to any other data that controls firmware in the 3D printer.

Figure 6:
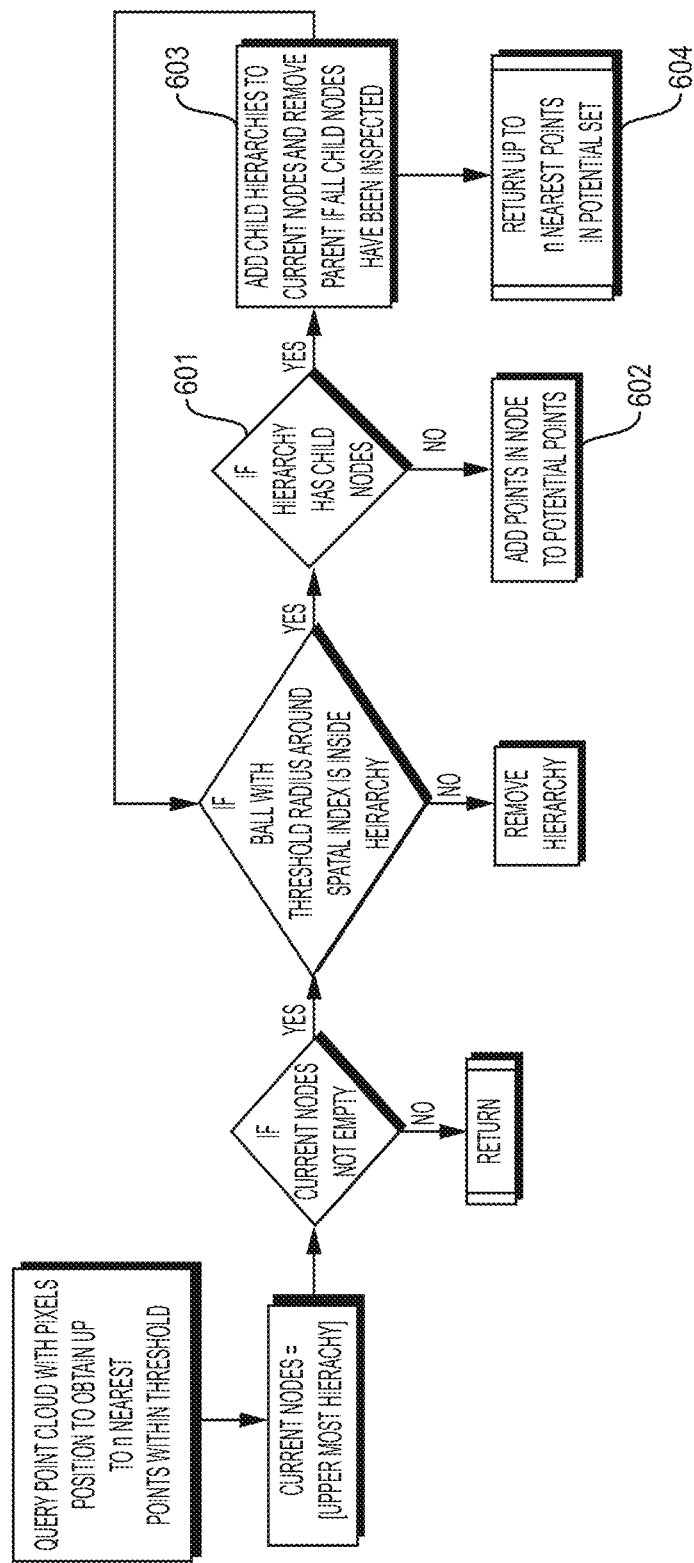
FIG. 6 is a flowchart for a method of performing a spatial query.

FIG. 6 is a flowchart for a method of performing a spatial query, in an illustrative implementation of this invention. In the example shown in FIG. 6, a computer finds up to n nearest points for a pixel within a specified distance threshold from the pixel, where n is a specified cap on the number of points that are found. For a given spatial index and radius, hierarchies of a spatial data structure may be traversed. In the example shown in FIG. 6, a given level of a hierarchy: (a) is searched for points if it intersects a sphere that is centered on the spatial index with the specified radius; and (b) is not searched for points if it does not intersect the sphere. The spatial query may proceed recursively, level by level of a hierarchy, in order to determine potential points (e.g., as shown in 601, 602, 603). Among the potential points that are identified in this manner, the up to n nearest points may be chosen 604.

Figure 7:
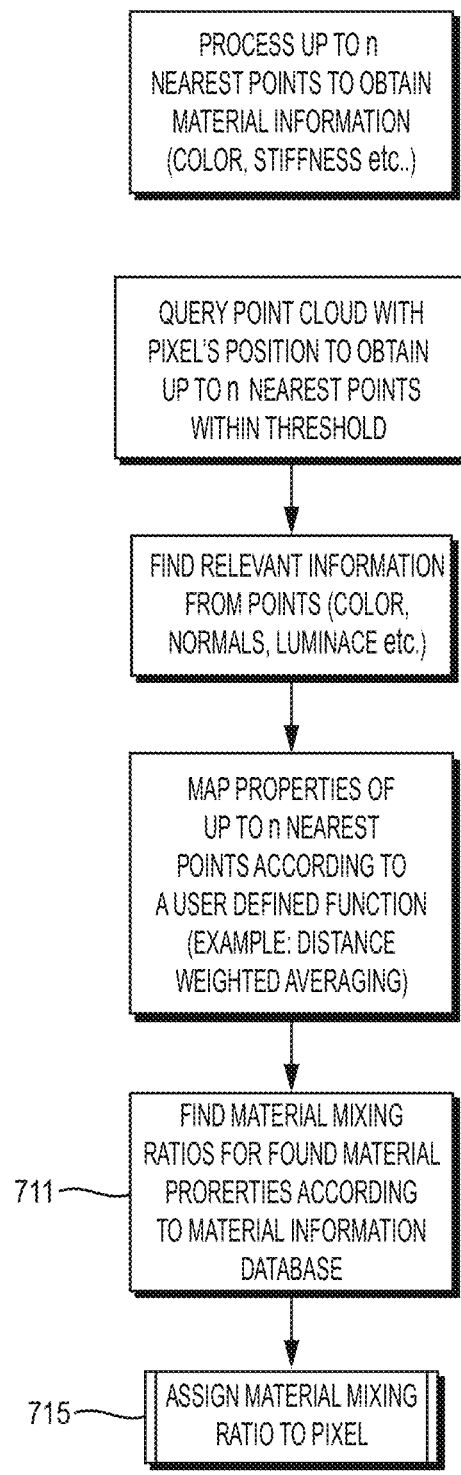
FIG. 7 is a flowchart for a method of determining a material mixing ratio for a pixel.

FIG. 7 is a flowchart for a method of determining a material mixing ratio for a pixel, in an illustrative implementation of this invention. In the example shown in FIG. 7, data from found points for a pixel is filtered to obtain a value for the pixel. This value may be used as an index to a material information database, where an associated material mixing ratio may be found 711. This material mixing ratio may be assigned to the pixel 715.

Figure 8:
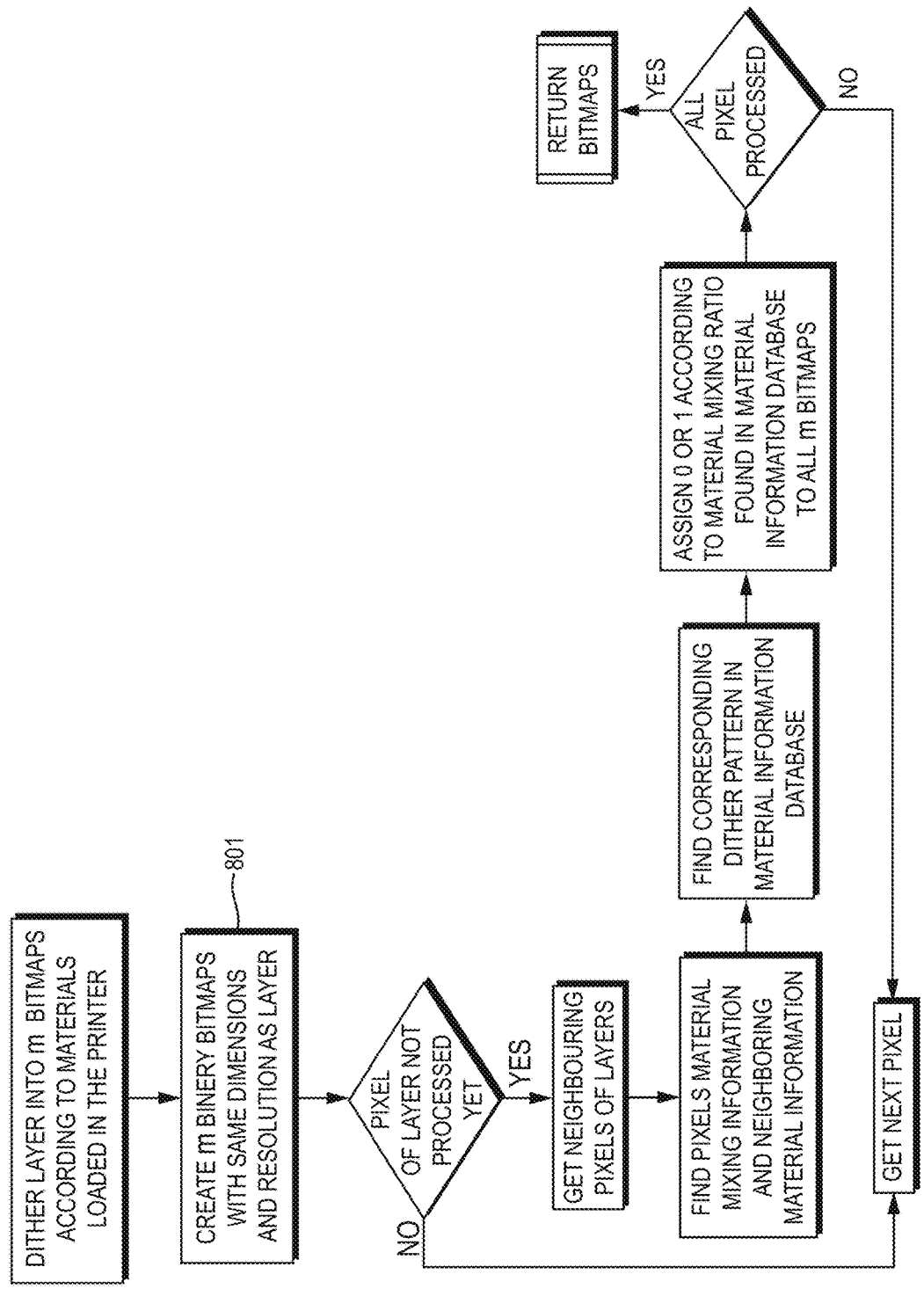
FIG. 8 is a flowchart for dithering.

FIG. 8 is a flowchart for dithering, in an illustrative implementation of this invention. In illustrative implementations of this invention, dithering may convert material mixing ratios to spatial droplet deposition instructions in the form of binary raster bitmap files.

Here is a non-limiting example of a dithering method that may be employed, in an illustrative implementation of this invention: for each layer m bitmaps may be created 801, where m is the number of materials loaded in the printer. There may be a separate bitmap for each print material for each layer, respectively. For each pixel in a layer, the material mixing ratio for the pixel may be found. Depending on this material mixing ratio of the pixel of the layer, the corresponding pixel in the bitmap may be set to 0 or 1. However, in this example, at one spatial location only one of the pixels of the m bitmaps may be set to 1, because a position in space may only be occupied by one material droplet at a time. Depending on the material mixing ratio, a computer probabilistically determines whether a pixel is assigned 0 or 1. In this example, a high material ratio of a certain material results in a high likelihood of a pixel being set to 1 in the corresponding binary bitmap and a low material ratio results in a high likelihood of the pixel being set to 0 in the corresponding binary bitmap. In this example, once all pixels in a layer are processed, the set of bitmaps for this layer is sent to the printer.

However, this invention is not limited to the dithering method described above. Any conventional dithering method may be employed, to convert the material mixing ratios of the pixels in a layer to material deposition information in binary raster files.

Figure 9:
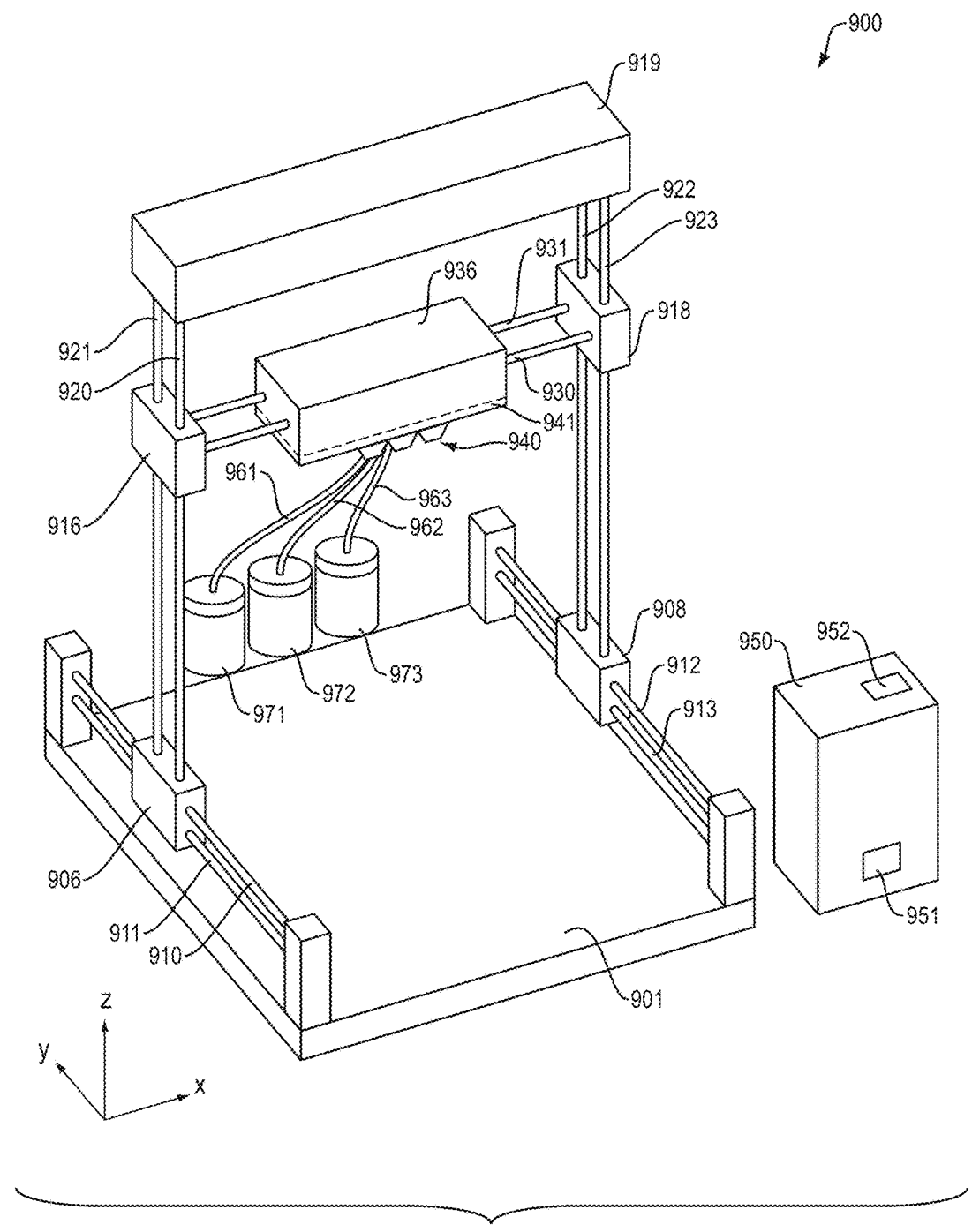
FIG. 9 is a diagram of hardware of a multi-material 3D printer.

FIG. 9 is a diagram of hardware of a multi-material 3D printer, in an illustrative implementation of this invention. In the example shown in FIG. 9: (a) a 3-axis actuation system actuates x-, y- and z-axis motion of a printhead 941; (b) printhead 941 has multiple nozzles 940, one nozzle per material that is loaded in the printer; (c) the actuation system includes y-axis actuators 906, 908, z-axis actuators 916, 918, and an x-axis actuator 936; (d) each of these actuators comprises an electric motor; (e) linear motion of y-axis actuator 906 is guided by guiderails 910 and 911; (f) linear motion of y-axis actuator 908 is guided by guiderails 912 and 913; (g) linear motion of z-axis actuator 916 is guided by guiderails 920 and 921; (h) linear motion of z-axis actuator 918 is guided by guiderails 922 and 923; (i) linear motion of x-axis actuator 936 is guided by guiderails 930 and 931; (j) three vessels 971, 972, 973 store three print materials, one material per vessel; (k) the print materials comprise UV-curable resins; (l) the three vessels 971, 972, 973 are connected to nozzles in the printhead 941 by flexible tubes 961, 962, 963, respectively, such that each vessel delivers a print material to a nozzle; (m) a support structure 919 stabilizes the gantry system, (n) during 3D printing, the 3D printer moves the printhead 941 to different x, y and z positions, while the printhead 941 deposits UV-curable resins, layer-by-layer, to fabricate an object that rests on print bed 901; (o) for each nozzle, deposition comprises the nozzle ejecting (jetting) material; (p) one or more computers 950 may each include an electronic memory storage device (e.g., 951) and one or more wireless modules for wireless communication (e.g., 952); (q) the one or more computers may convert an unorganized point cloud into binary raster files that encode material deposition information; and (r) the one or more computer(s) 950 may control (e.g., via microcontrollers housed in actuators and the printhead 941) actuation of the printhead and deposition of material by the printhead.

Prototype of Invention

The following paragraph describes a prototype of this invention. This prototype is a non-limiting example of this invention. This invention may be implemented in many other ways.

In this prototype, the point cloud contains color information and the 3D printer is a Stratasys® J750 multi-material printer that is loaded with six print materials: cyan, magenta, yellow, black, white and transparent base resins. The generated layers have a resolution of 300 to 600 dpi in the horizontal and a down to 12 micron layer separation in the vertical print direction. For each pixel in a layer, a computer spatially queries an unorganized point cloud to find a set of points near to the pixel, then filters color values associated with the found points to determine a color value for the pixel, and then determines a material mixing ratio for the pixel. The material mixing ratios for the pixels in a layer are dithered into the material droplet descriptions in the form of a binary raster files. For each layer, there are six binary raster files (one file for each of the six print materials, respectively). The set of binary raster files for a layer describes, by a binary matrix, the spatial deposition of material droplets for that layer. This matrix may be interpreted by the 3D printer as instructions for placement, or no placement, of associated material droplets.

Color Replication of Cultural Artifacts

In some implementations, this invention performs full color and transparency printing, and thus is well-suited for the conservation and archiving of cultural and archaeological artifacts. Such artifacts are often recorded using 3D scanning devices that produce point cloud data. In some implementations of this invention: (a) point cloud data may be acquired by optically scanning a cultural or archeological artifact; (b) the point cloud data may be efficiently converted into binary raster files with material deposition information, and (c) based on the binary raster files, a 3D printer may fabricate a physical object that accurately replicates the scanned artifact. In some implementations of this invention: (a) high-resolution dithering facilitates continuous material gradients between colors; (b) multiple resins, each with a different color, are loaded on the printer; and (c) the high-resolution dithering and the multiple colors of resins together facilitate a high range of color fidelity during 3D printing.

More Details

As noted above, a "PC-to-BRF conversion" means conversion of an unorganized point cloud into binary raster layers that encode material deposition instructions.

As used herein, a "boundary representation" of a physical object means a digital model that represents the physical object as a 3D surface, which 3D surface (a) comprises a mesh of polygons and (b) approximates the exterior surface of the physical object. Non-limiting examples of boundary representations include: polygon meshes as represented by face-vertex meshes, winged-edge meshes, half-edge meshes, quad-edge meshes, corner-table meshes, vertex-vertex meshes, render dynamic meshes, streaming meshes, progressive meshes, and normal meshes; Non-limiting examples of software file formats for boundary representations include: .stl (3D Systems® stereolithography), .raw, .blend, .fbx (Autodesk® FBX), .dae (digital asset exchange), .dgn, 0.3 dm (Rhino®), .dxg (Autodesk® drawing exchange), .obj (Wavefront® OBG), .ply (polygon), and .amf (additive manufacturing file).

In many implementations of this invention, one or more computers perform a PC-to-BRF conversion by an algorithm that does not involve generating a boundary representation of an object to be printed.

In many implementations of this invention, one or more computers perform a PC-to-BRF conversion by an algorithm that does not involve generating a boundary representation of a solid, opaque object to be printed.

In many implementations of this invention: (a) a hull is selected that encloses all or a part of the point cloud; and (b) the hull does not comprise a boundary representation of an object to be printed.

Alternatively, in some cases: (a) a hull is selected that encloses all or a part of the point cloud; and (b) the hull comprises a boundary representation of a solid, opaque object to be printed. Alternatively, in some cases: (a) a hull is selected that encloses all or a part of the point cloud; and (b) the hull defines the exterior of an object to be printed, which object will, when printed, included a transparent outer region.

Thus, in some implementations, one or more computers perform a PC-to-BRF conversion by an algorithm that does not—except for generating a hull to enclose all or part of a point cloud—involve generating a boundary representation of an object to be printed. Likewise, in some implementations of this invention, one or more computers perform a PC-to-BRF conversion by an algorithm that does not—except for generating a hull to enclose all or part of a point cloud—involve generating a boundary representation of a solid, opaque object to be printed.

In illustrative implementations, a computer generates a visual representation of the point cloud, which is displayed to the user via a user interface, in order to allow the user to preview the object to be printed. However, generating this visualization is not part of the PC-to-BRF computational pipeline itself. Thus, as used herein, the term "PC-to-BRF conversion" does not include converting a point cloud into data encoding a visual representation to be displayed to a human user on a display screen.

In many implementations of this invention, generating the visual representation (for preview display to a human user) does not involve creating a boundary representation. Instead, the visualization may be generated, loosely speaking, directly from the point cloud data.

In illustrative implementations, a computer converts an unorganized point cloud into a spatial data structure, to facilitate spatial queries.

As used herein, a "data point" means a virtual point that is represented by data that encodes at least (a) spatial coordinates of the point and (b) one or more material properties associated with the point. Unless the context clearly indicates otherwise, a "point" in a point cloud or in a spatial data structure is a data point.

In illustrative implementations, there is a one-to-one correspondence between the data points in the point cloud and the data points in the spatial data structure. The number of data points may be the same in both. The data points in the spatial data structure may have the same spatial coordinates as the data points in the point cloud. Thus, in many implementations, for each given data point in the unorganized point cloud, there is a corresponding data point in the spatial data structure, and the given point and corresponding point are in the same spatial position.

In many implementations, the data points in the spatial data structure are not constrained to be located at grid intersections of a regularly-spaced 3D grid, just as the data points in the unorganized point cloud are not constrained to be located at grid intersections of a regularly-spaced 3D grid In many implementations, the values of the material properties (in the point cloud, as compared to the spatial data structure) may match. Thus, in many implementations: (a) for each given data point in the unorganized point cloud, there is a corresponding data point in the spatial data structure; and (b) each material property associated with the given data point in the point cloud is identical to a material property associated with the corresponding data point in the spatial data structure (e.g., if a specified material property has a value, then the value is the same for both the given point in the point cloud and the corresponding point in the spatial data structure).

In illustrative implementations of this invention, one or more data points of a spatial data structure may be located in a single node, which node is at the lowest (smallest) level of spatial hierarchy in the spatial data structure. For example, if the lowest level of hierarchy in a spatial data structure is a "leaf", then none, one or multiple data points in the spatial data structure may be located in a single leaf.

In contrast, in a conventional 3D voxel representation: (a) each voxel is a volume, rather than a point; (b) each voxel is centered at, or that has a vertex located at (or that is shifted by the same distance in the same direction from), a grid point in a regularly-spaced 3D grid; and (c) the lowest level of spatial hierarchy in conventional 3D voxel representation is a voxel, and thus there is only one voxel located in any one voxel. Furthermore, a conventional 3D voxel representation comprises multiple layers of voxels that are stored in memory simultaneously.

In some implementations of this invention, when a point cloud or spatial data structure is divided into pixels, no data is initially associated with the pixels (except data, such as spatial coordinates, that specify spatial position or spatial indexing). In some cases, certain additional data regarding pixels in a layer: (a) is added only while the layer is being processed; and (b) is deleted before processing for the next layer begins. For example, this additional data may include: (a) the identity of found points for pixels in the layer; (b) distance calculations for pixels in the layer; (c) values (e.g., color) outputted by a filter regarding pixels in the layer; and (d) material mixing ratios for pixels in the layer.

In illustrative implementations, a computer may use at least three digital representations of a spatial region ("virtual spatial models"): (1) an unorganized point cloud; (2) a spatial data structure; and (3) a set of binary raster files for each material loaded in the 3D printer, where each raster file in the set corresponds to a layer that will be printed.

In many implementations: (a) corresponding points in all the virtual spatial models have identical spatial coordinates; and (b) all the virtual spatial models may have the same origin and the same axes in the same directions. In many implementations, a computer may, at least implicitly, treat the virtual spatial models as representing the same volume of space. Furthermore, in many implementations, each pixel in a binary raster file has the same spatial coordinates as the corresponding point in the physical build region (the corresponding point being the point in the physical build region at which material for the pixel is depositable).

Alternatively, in some cases: (a) points in one virtual digital model are mapped to points in another virtual digital model by a transformation (e.g., an affine transformation); (b) a first point that maps to a second point, according to the transformation, is treated as a corresponding point; and (c) a point in a virtual spatial model may have different spatial coordinates than that of a corresponding point in another virtual spatial model. Likewise, in some cases: (a) each pixel in a binary raster file, respectively, is mapped by a transformation (e.g., an affine transformation) to a given point in a physical build region, which given point is where material for that pixel is depositable; (b) a first point that maps to a second point, according to the transformation, is treated as a corresponding point; and (c) a pixel in a binary raster file may have different spatial coordinates than that of a corresponding point in the physical build region.

Some Alternative Implementations

In many implementations of this invention, the spatial position of points in a point cloud are described by Cartesian spatial coordinates. Alternatively, in some implementations, other 3D spatial coordinates—such as spherical coordinates or cylindrical coordinates—are employed to describe spatial position (e.g., spatial position of points in a point cloud).

In many implementations of this invention, a computer converts a point cloud into binary raster files (bitmaps) that encode material deposition instructions. Alternatively, a computer may convert a point cloud into one or more 2D bitfields that encode material deposition instructions. A 2D bitfield represents each pixel with multiple bits. For example, in some implementations, each pixel of a 2D bitfield raster file (that encodes material deposition instructions) may be represented by six bits, such that 000 encodes for no deposition 001 to 110 encode for cyan, magenta, yellow, black, transparent material deposition and 111 encodes for support material deposition.

Software

Two non-limiting examples of pseudo-code are set forth below. These two examples of pseudo-code may be employed in an illustrative implementation of this invention.

Pseudo-Code Example 1: This is pseudo-code for finding material mixing ratios from point cloud color values. In this pseudo-code: (a) each pixel is traversed and the point cloud is indexed; (b) the found points are used to determine the final color values (by inverse distance weighting); and (c) color values are mapped to material mixing ratios.

Pseudo-Code Example 2: This is pseudo-code for dithering of material mixing ratios according to loaded cyan (C), magenta (M), yellow (Y), black (K), transparent (A) resins. In this pseudo-code: (a) only pixels inside a hull are processed; (b) if previously no material information was found for a pixel, then the pixel is assigned transparent material; (c) other material depositions are determined by probability to be deposited; and (d) a separate bitmap is then created for each layer for each print material, and the pixels' respective values are written to the bitmap.

This invention is not limited to these two examples of pseudo-code. This invention may be implemented by a wide variety of software.

Computers

In illustrative implementations of this invention, one or more computers (e.g., servers, network hosts, client computers, integrated circuits, microcontrollers, controllers, field-programmable-gate arrays, personal computers, or digital computers) are programmed or specially adapted to perform one or more of the following tasks: (1) to convert an unorganized point cloud into binary raster files that encode material deposition instructions; (2) to create a spatial data structure (e.g., to facilitate spatial queries); (3) to perform spatial queries (e.g., to find a set of nearest points); (4) to filter data associated with found points; (5) to compute material mixing ratios (e.g., by consulting a look-up table); (6) to dither (e.g., to dither material mixing ratios to create binary raster files); (7) to send binary raster files to a 3D printer; (8) to generate, based on binary raster files, printer-level instructions for a 3D printer (e.g., G-codes); (9) to control hardware of a 3D printer, including one or more actuators, printheads, pumps, valves, and power supplies (e.g., to cause the 3D printer to fabricate a physical object); (10) to perform a computer simulation to generate an unorganized point cloud; (11) to control a 3D optical scanner, including to scan a physical object and output an unorganized point cloud; (12) to control a user interface, such that the interface accepts user inputs, including inputs regarding creating or modifying a point cloud, and such that the interface displays a visual preview of an object to be printed; (13) to receive data from, control, or interface with one or more sensors; (14) to perform any other calculation, computation, program, algorithm, or computer function described or implied above; (15) to receive signals indicative of human input; (16) to output signals for controlling transducers for outputting information in human perceivable format; (17) to process data, to perform computations, to execute any algorithm or software, and (18) to control the read or write of data to and from memory devices (items 1-18 of this sentence referred to herein as the "Computer Tasks"). The one or more computers (e.g. 950) may be in any position or positions within or outside of a 3D printer or optical scanner. The one or more computers may communicate with each other or with other devices either: (a) wirelessly, (b) by wired connection, (c) by fiber-optic link, or (d) by a combination of wired, wireless or fiber optic links.

In exemplary implementations, one or more computers are programmed to perform any and all calculations, computations, programs, algorithms, computer functions and computer tasks described or implied above. For example, in some cases: (a) a machine-accessible medium has instructions encoded thereon that specify steps in a software program; and (b) the computer accesses the instructions encoded on the machine-accessible medium, in order to determine steps to execute in the program. In exemplary implementations, the machine-accessible medium may comprise a tangible non-transitory medium. In some cases, the machine-accessible medium comprises (a) a memory unit or (b) an auxiliary memory storage device. For example, in some cases, a control unit in a computer fetches the instructions from memory.

In illustrative implementations, one or more computers execute programs according to instructions encoded in one or more tangible, non-transitory, computer-readable media. For example, in some cases, these instructions comprise instructions for a computer to perform any calculation, computation, program, algorithm, or computer function described or implied above. For example, in some cases, instructions encoded in a tangible, non-transitory, computer-accessible medium comprise instructions for a computer to perform the Computer Tasks.

Network Communication

In illustrative implementations of this invention, one or more electronic devices (e.g., computer 950, 3D-scanner 102, or microcontrollers in printhead 941 or microcontrollers in actuators 906, 908, 916, 918, 936) are configured for wireless or wired communication with other electronic devices in a network.

For example, in some cases, one or more of these electronic devices may each include a wireless module for wireless communication with other electronic devices in a network. Each wireless module (e.g., 952) may include (a) one or more antennas, (b) one or more wireless transceivers, transmitters or receivers, and (c) signal processing circuitry. Each wireless module may receive and transmit data in accordance with one or more wireless standards.

In some cases, one or more of the following hardware components are used for network communication: a computer bus, a computer port, network connection, network interface device, host adapter, wireless module, wireless card, signal processor, modem, router, cables or wiring.

In some cases, one or more computers (e.g., computer 950, or microcontrollers in printheads, actuators or 3D scanners) are programmed for communication over a network. For example, in some cases, one or more computers are programmed for network communication: (a) in accordance with the Internet Protocol Suite, or (b) in accordance with any other industry standard for communication, including any USB standard, ethernet standard (e.g., IEEE 802.3), token ring standard (e.g., IEEE 802.5), wireless standard (including IEEE 802.11 (wi-fi), IEEE 802.15 (bluetooth/zigbee), IEEE 802.16, IEEE 802.20 and including any mobile phone standard, including GSM (global system for mobile communications), UMTS (universal mobile telecommunication system), CDMA (code division multiple access, including IS-95, IS-2000, and WCDMA), or LTS (long term evolution)), or other IEEE communication standard.

Definitions

The terms "a" and "an", when modifying a noun, do not imply that only one of the noun exists. For example, a statement that "an apple is hanging from a branch": (i) does not imply that only one apple is hanging from the branch; (ii) is true if one apple is hanging from the branch; and (iii) is true if multiple apples are hanging from the branch.

To compute "based on" specified data means to perform a computation that takes the specified data as an input.

"Boundary representation" is defined above.

"BSDF" means bidirectional scattering distribution function.

The term "comprise" (and grammatical variations thereof) shall be construed as if followed by "without limitation". If A comprises B, then A includes B and may include other things.

The term "computer" includes any computational device that performs logical and arithmetic operations. For example, in some cases, a "computer" comprises an electronic computational device, such as an integrated circuit, a microprocessor, a mobile computing device, a laptop computer, a tablet computer, a personal computer, or a mainframe computer. In some cases, a "computer" comprises: (a) a central processing unit, (b) an ALU (arithmetic logic unit), (c) a memory unit, and (d) a control unit that controls actions of other components of the computer so that encoded steps of a program are executed in a sequence. In some cases, a "computer" also includes peripheral units including an auxiliary memory storage device (e.g., a disk drive or flash memory), or includes signal processing circuitry. However, a human is not a "computer", as that term is used herein.

"Data point" is defined above.

"Defined Term" means a term or phrase that is set forth in quotation marks in this Definitions section.

To "delete" data includes to overwrite the data.

For an event to occur "during" a time period, it is not necessary that the event occur throughout the entire time period. For example, an event that occurs during only a portion of a given time period occurs "during" the given time period.

The term "e.g." means for example.

The fact that an "example" or multiple examples of something are given does not imply that they are the only instances of that thing. An example (or a group of examples) is merely a non-exhaustive and non-limiting illustration.

Unless the context clearly indicates otherwise: (1) a phrase that includes "a first" thing and "a second" thing does not imply an order of the two things (or that there are only two of the things); and (2) such a phrase is simply a way of identifying the two things, respectively, so that they each may be referred to later with specificity (e.g., by referring to "the first" thing and "the second" thing later). For example, unless the context clearly indicates otherwise, if an equation has a first term and a second term, then the equation may (or may not) have more than two terms, and the first term may occur before or after the second term in the equation. A phrase that includes a "third" thing, a "fourth" thing and so on shall be construed in like manner.

"Filter output" means one or more values outputted by a filter.

"For instance" means for example.

To say a "given" X is simply a way of identifying the X, such that the X may be referred to later with specificity. To say a "given" X does not create any implication regarding X. For example, to say a "given" X does not create any implication that X is a gift, assumption, or known fact.

"Herein" means in this document, including text, specification, claims, abstract, and drawings.

As used herein, "hull" means a virtual surface that encloses all or part of a point cloud.

As used herein: (1) "implementation" means an implementation of this invention; (2) "embodiment" means an embodiment of this invention; (3) "case" means an implementation of this invention; and (4) "use scenario" means a use scenario of this invention.

The term "include" (and grammatical variations thereof) shall be construed as if followed by "without limitation".

"I/O device" means an input/output device. Non-limiting examples of an I/O device include a touch screen, other electronic display screen, keyboard, mouse, microphone, handheld electronic game controller, digital stylus, display screen, speaker, or projector for projecting a visual display.

To say that a data point is "inside" a hull means that the data point is located in the interior of the hull or is intersected by the hull.

To say that a material is "loaded" on a 3D printer means that: (a) the material is a print material; and (b), during fabrication by the 3D printer, the material will be stored in the 3D printer (or in a container that is fluidically connected to the 3D printer) and will be deposited from the 3D printer.

To say that a data point is located at a given position means that the spatial coordinates of the data point specify the given position.

"Material deposition instruction" for a pixel means data that specifies whether or not a given material is to be deposited at a location (in the build region of the 3D printer) that corresponds to the pixel.

"Material mixing ratio" is defined above.

"Multi-material 3D printer" means a 3D printer that deposits multiple materials during fabrication of a single object.

"Native resolution" means the minimum resolution of a 3D printer. However, if a given 3D printer has different minimum resolutions for different printing situations (e.g., different minimum resolutions for different types of material), then, unless the context clearly indicates otherwise, "native resolution" of the given 3D printer means the smallest of these minimum resolutions.

The term "or" is inclusive, not exclusive. For example, A or B is true if A is true, or B is true, or both A or B are true. Also, for example, a calculation of A or B means a calculation of A, or a calculation of B, or a calculation of A and B.

A parenthesis does not mean that the parenthetical material is optional or may be ignored.

"PC-BRF conversion" is defined above.

A "point cloud" or "unorganized point cloud" means a set of virtual points, such that: (a) for each point in the set, data is associated with the point, which data specifies at least spatial coordinates of the point and one or more material properties of the point; and (b) the points in the point cloud are not constrained to be located at grid intersections of a regularly-spaced 3D grid.

Unless the context clearly indicates otherwise, a phrase that denotes a point cloud (however the phrase is worded) includes a spatial data structure into which a point cloud has been organized. Likewise, unless the context clearly indicates otherwise, a phrase that denotes point(s) in a point cloud (however the phrase is worded) includes point(s) in a spatial data structure into which a point cloud has been organized.

Unless the context clearly indicates otherwise, to "print" means to fabricate.

"Print material" means a material that is deposited by a 3D printer to fabricate an object.

"Regularly-spaced 3D grid" means a 3D grid such that, for each axis of the grid, respectively, the distance between neighboring grid points along that axis is uniform. The term "regularly-spaced 3D grid" does not create any implication regarding whether or not the distance between neighboring grid points for one axis of the grid is the same as that for another axis of the grid.

"RGBA" means red green blue alpha.

Unless the context clearly indicates otherwise, "some" means one or more.

The term "such as" means for example.

To say that a machine-readable medium is "transitory" means that the medium is a transitory signal, such as an electromagnetic wave.

"3D" means three-dimensional.

"3D voxel representation" means a representation that comprises multiple layers of voxels, such that: (a) there are multiple voxels in each layer; (b) each voxel represents a finite volume, and (c) each voxel is centered at, or that has a vertex located at (or that is shifted by the same distance in the same direction from), a grid point in a regularly-spaced 3D grid.

"2D" means two-dimensional.

A non-limiting example of a "vector" is a one-dimensional array. (Without affecting this definition in any way, we note that this meaning is common in computer science).

Unless the context clearly indicates otherwise, "virtual" means described by, or existing in, a computer model or a computer-generated representation, and not physically existing. However, a virtual thing may correspond to, or represent, a physical thing.

Except to the extent that the context clearly requires otherwise, if steps in a method are described herein, then the method includes variations in which: (1) steps in the method occur in any order or sequence, including any order or sequence different than that described; (2) any step or steps in the method occurs more than once; (3) any two steps occur the same number of times or a different number of times during the method; (4) any combination of steps in the method is done in parallel or serially; (5) any step in the method is performed iteratively; (6) a given step in the method is applied to the same thing each time that the given step occurs or is applied to different things each time that the given step occurs; (7) one or more steps occur simultaneously, or (8) the method includes other steps, in addition to the steps described herein.

Headings are included herein merely to facilitate a reader's navigation of this document. A heading for a section does not affect the meaning or scope of that section.

This Definitions section shall, in all cases, control over and override any other definition of the Defined Terms. The Applicant or Applicants are acting as his, her, its or their own lexicographer with respect to the Defined Terms. For example, the definitions of Defined Terms set forth in this Definitions section override common usage or any external dictionary. If a given term is explicitly or implicitly defined in this document, then that definition shall be controlling, and shall override any definition of the given term arising from any source (e.g., a dictionary or common usage) that is external to this document. If this document provides clarification regarding the meaning of a particular term, then that clarification shall, to the extent applicable, override any definition of the given term arising from any source (e.g., a dictionary or common usage) that is external to this document. To the extent that any term or phrase is defined or clarified herein, such definition or clarification applies to any grammatical variation of such term or phrase, taking into account the difference in grammatical form. For example, the grammatical variations include noun, verb, participle, adjective, and possessive forms, and different declensions, and different tenses.

Variations

This invention may be implemented in many different ways. Here are some non-limiting examples:

In some implementations, this invention is a method comprising: (a) converting an unorganized point cloud into a spatial data structure, such that data points in the spatial data structure are not constrained to be located at grid points of a regularly-spaced 3D grid; (b) computationally dividing the spatial data structure into layers, and computationally dividing each of the layers into pixels; (c) performing, for each respective pixel in each respective layer (i) a spatial query to try to find a set of data points, which set of points consists of not more than a specified number of points that are nearest in distance to the respective pixel and are within a specified distance threshold from the respective pixel, and (ii) computations to determine a material mixing ratio for the respective pixel; (d) calculating, for each respective layer, a set of binary raster files that encode material deposition instructions; (e) generating, based on binary raster files for the layers, printer instructions that control a multi-material 3D printer; and (f) using the multi-material 3D printer to physically fabricate a physical object, in accordance with the printer instructions. In some cases, steps (a), (b) and (c) of the first sentence of this paragraph do not include generating a boundary representation of the object. In some cases: (a) one or more computers perform an algorithm that takes, as input, data in the unorganized point cloud and that outputs the binary raster files that encode material deposition instructions; and (b) the algorithm does not include generating a boundary representation of the object. In some cases: (a) steps (a), (b) and (c) of the first sentence of this paragraph do not include generating a boundary representation of the physical object; and (b) the physical object, when fabricated by the multi-material 3D printer, is (i) solid and (ii) opaque at all of the exterior surface of the physical object. In some cases: (a) one or more computers perform an algorithm that takes, as input, data in the unorganized point cloud and that outputs the binary raster files that encode material deposition instructions; (b) the algorithm does not include generating a boundary representation of the physical object; and (c) the physical object, when fabricated by the multi-material 3D printer, is (i) solid and (ii) opaque at all of the exterior surface of the physical object. In some cases, wherein steps (a), (b), and (c) of the first sentence of this paragraph do not include generating a 3D voxel representation of the object. In some cases: (a) one or more computers perform an algorithm that takes, as input, data in the unorganized point cloud and that outputs the binary raster files that encode material deposition instructions; and (b) the algorithm does not include generating a 3D voxel representation of the object. In some cases: (a) a radius is associated with each point in the point cloud; and (b) a given point is not eligible to be included in the set of points returned by a spatial query for a given pixel, if the distance between the given point and the given pixel exceeds the radius. In some cases, the method includes determining a hull that encloses all or part of the point cloud or of the spatial data structure. In some cases, if a spatial query for a given pixel finds one or more data points inside the hull that are within the specified distance threshold, then the material mixing ratio for the given pixel is computed based on data that is associated with the one or more data points and that represents one or more material properties. In some cases, if a spatial query for a given pixel finds that there are no data points inside the hull that are within the specified distance threshold, then the material deposition instructions for the given pixel comprise instructions to deposit transparent material. In some cases, if a spatial query for a given pixel finds that there are no data points inside the hull that are within the specified distance threshold, then material deposition instructions for the given pixel are determined by interpolation, based on data regarding other pixels. In some cases, for each given data point in the spatial data structure, respectively, there is a corresponding data point in the unorganized point cloud, such that the spatial coordinates of the given data point and the spatial coordinates of the corresponding data point are identical. In some cases: (a) a first set of one or more material properties is associated with the given data point in the spatial data structure; (b) a second set of one or more material properties is associated with the corresponding data point in the unorganized point cloud; and (c) the first and second sets of material properties are identical, including identical in type and identical in state or value. In some cases, data generated during step (c) of the first sentence of this paragraph while processing a given layer is deleted before performing step (c) of the first sentence of this paragraph for another layer. Each of the cases described above in this paragraph is an example of the method described in the first sentence of this paragraph, and is also an example of an embodiment of this invention that may be combined with other embodiments of this invention.

In some implementations, this invention is a system comprising (a) a multi-material 3D printer; and (b) one or more non-transitory computer readable media, with instructions encoded thereon that instruct one or more computers to execute an algorithm that includes the following steps: (i) converting an unorganized point cloud into a spatial data structure, such that data points in the spatial data structure are not constrained to be located at grid points of a regularly-spaced 3D grid, (ii) computationally dividing the spatial data structure into layers, and computationally dividing each of the layers into pixels, (iii) performing, for each respective pixel in each respective layer (A) a spatial query to try to find a set of data points, which set of points consists of not more than a specified number of points that are nearest in distance to the respective pixel and are within a specified distance threshold from the respective pixel, and (B) computations to determine a material mixing ratio for the respective pixel, (iv) calculating, for each respective layer, a set of binary raster files that encode material deposition instructions, and (v) generating, based on binary raster files for the layers, printer instructions for the multi-material 3D printer to physically fabricate a physical object. In some cases, the instructions encoded by the computer readable media do not instruct the one or more computers to, as part of the steps specified in clause (b) of the preceding sentence, generate any boundary representation or 3D voxel representation. In some cases, for each given data point in the spatial data structure, respectively, there is a corresponding data point in the unorganized point cloud, such that the spatial coordinates of the given data point and the spatial coordinates of the corresponding data point are identical. In some cases: (a) a first set of one or more material properties is associated with the given data point in the spatial data structure; (b) a second set of one or more material properties is associated with the corresponding data point in the unorganized point cloud; and (c) the first and second sets of material properties are identical, including identical in type and identical in state or value. In some cases: (a) a radius is associated with each point in the point cloud; and (b) a given point is not eligible to be included in the set of points returned by a spatial query for a given pixel, if the distance between the given point and the given pixel exceeds the radius. Each of the cases described above in this paragraph is an example of the system described in the first sentence of this paragraph, and is also an example of an embodiment of this invention that may be combined with other embodiments of this invention.

Each description above of any method or apparatus of this invention describes a non-limiting example of this invention. This invention is not limited to those examples, and may be implemented in other ways.

Each description above of any implementation, embodiment or case of this invention (or any use scenario for this invention) describes a non-limiting example of this invention. This invention is not limited to those examples, and may be implemented in other ways.

Each Figure that illustrates any feature of this invention shows a non-limiting example of this invention. This invention is not limited to those examples, and may be implemented in other ways.

The Provisional Application does not limit the scope of this invention. The Provisional Application describes non-limiting examples of this invention, which examples are in addition to—and not in limitation of—the implementations of this invention that are described in the main part of this document. For example, if any given feature described in the Provisional Application is different from, or in addition to, the features described in the main part of this document, this additional or different feature of the Provisional Application does not limit any implementation of this invention described in the main part of this document, but instead merely describes another example of this invention. As used herein, the "main part of this document" means this entire document (including any drawings listed in the Brief Description of Drawings above and any software file listed in the Computer Program Listing section above)), except that the "main part of this document" does not include any document that is incorporated by reference herein.

The above description (including without limitation any attached drawings and figures), together with the pseudocode set forth below, describes illustrative implementations of the invention. However, the invention may be implemented in other ways. The methods and apparatus which are described herein are merely illustrative applications of the principles of the invention. Other arrangements, methods, modifications, and substitutions by one of ordinary skill in the art are therefore also within the scope of the present invention. Numerous modifications may be made by those skilled in the art without departing from the scope of the invention. Also, this invention includes without limitation each combination and permutation of one or more of the implementations (including hardware, hardware components, methods, processes, steps, software, algorithms, features, or technology) that are described or incorporated by reference herein.

Pseudocode Example 1

```
foreach( pixel; layer.pixels) {
    vector4 color[ ] = { };
    float distances[ ] = { };
    float weights[ ] = { };
    float mix[ ] = { };
    float pixelRadius = 0.1;
    vector pixelPosition = pixel.Position;
    int nPoints = 10;
    void DWAColorFilterAquireData(vector4 color[ ]; float distances[ ];
int handle; vector pos) {
        float pointP;
        vector pointColor;
        pcimport(handle, "P", pointP);
        pcimport(handle, "Cd", pointColor);
        push(color, pointColor);
        float d = distance(pos, pointP);
        push(distances, d);
    }
    vector4 DWAColorFilterFilter(vector4 color[ ]; float distances[ ];
float weights[ ]) {
        float maxd = 0.0;
        float dsum = 0.0;
        vector4 filterColor = {0.0, 0.0, 0.0};
        for(int i=0;i<len(distances);i++){
            if(distances[i] > maxd) {
                maxd = distances[i];
                dsum += 1/distances[i];
            }
        }
        for(int i=0;i<len(distances);i++){
            weights[i] = 1/distances[i];
        }
        for(int i=0;i<len(distances);i++){
            filterColor += ((weights[i]*color[i])/dsum);
        }
        return filterColor;
    }
    int handle = pcopen( 1, "P", pixelPosition, pixelRadius, nPoints);
    while( pciterate(handle) ) {
        DWAColorFilterAquireData(color,distances,handle,
            pixelPosition);
    }
    vector4 fColor = DWAColorFilterFilter(color, distances, weights);
    if( pcnumfound(handle) == 0 ) {
        pixel.Found = 0;
    } else {
        pixel.Found = 1;
    }
    lookupColorToMat(fColor,mix);
    pixel.Mix = mix;
```

Pseudocode Example 2

```
foreach( pixel; layer.pixels ) {
    vector pixelP = pixel.Position;
    float val = random(pixelP);
    printf("%f\n",val);
    float C = pixel.Mix[0];
    float M = pixel.Mix[1];
    float Y = pixel.Mix[2];
    float K = pixel.Mix[3];
    float A = pixel.Mix[4];
    pixel.M[0] = false;
    pixel.M[1] = false;
    pixel.M[2] = false;
    pixel.M[3] = false;
    pixel.M[4] = false;
    if(pixel.inside==1) {
        if(pixel.found==0) {
            pixel.M[4] = 1.0;
        } else {
            if(val< C) {
                pixel.M[0] = true;
            } else if (val >= C && val < C+M) {
                pixel.M[1] = true;
            } else if (val >= C+M && val < C+M+Y) {
                pixel.M[2] = true;
            } else if (val > C+M+Y) {
                pixel.M[2] = true;
            }
        }
    }
}
foreach( M ; pixel.M ) {
    int handle = createBitmap(layer.resx ; layer.resy)
    int mateiralIndex = M.idx;
    foreach( pixel; layer.pixels ) {
        writePixel(handle, pixel.x , pixel.y , pixel.M[materialIndex] )
    }
}
```

What is claimed is:

1. A method comprising:
    (a) converting an unorganized point cloud into a spatial data structure, such that data points in the spatial data structure are not constrained to be located at grid points of a regularly-spaced 3D grid;
    (b) computationally dividing the spatial data structure into layers, and computationally dividing each of the layers into pixels;

(c) performing, for each respective pixel in each respective layer
  (i) a spatial query to try to find a set of data points, which set of points consists of not more than a specified number of points that are nearest in distance to the respective pixel and are within a specified distance threshold from the respective pixel, and
  (ii) computations to determine a material mixing ratio for the respective pixel;
(d) calculating, for each respective layer, a set of binary raster files that encode material deposition instructions;
(e) generating, based on binary raster files for the layers, printer instructions that control a multi-material 3D printer; and
(f) using the multi-material 3D printer to physically fabricate a physical object, in accordance with the printer instructions;
wherein the converting, the dividing into layers, the dividing into pixels, and the performing (i) do not include generating any boundary representation of the object and (ii) do not include generating any 3D voxel representation of the object.

2. The method of claim 1, wherein:
(a) the physical object, when fabricated by the multi-material 3D printer, is (i) solid and (ii) opaque at all of the exterior surface of the physical object.

3. The method of claim 1, wherein:
(a) a radius is associated with each point in the point cloud; and
(b) a given point is not eligible to be included in the set of points returned by a spatial query for a given pixel, if the distance between the given point and the given pixel exceeds the radius.

4. The method of claim 1, wherein the method includes determining a hull that encloses all or part of the point cloud or of the spatial data structure.

5. The method of claim 4 wherein, if a spatial query for a given pixel finds one or more data points inside the hull that are within the specified distance threshold, then the material mixing ratio for the given pixel is computed based on data that is associated with the one or more data points and that represents one or more material properties.

6. The method of claim 4 wherein, if a spatial query for a given pixel finds that there are no data points inside the hull that are within the specified distance threshold, then the material deposition instructions for the given pixel comprise instructions to deposit transparent material.

7. The method of claim 4, wherein, if a spatial query for a given pixel finds that there are no data points inside the hull that are within the specified distance threshold, then material deposition instructions for the given pixel are determined by interpolation, based on data regarding other pixels.

8. The method of claim 1, wherein, for each given data point in the spatial data structure, respectively, there is a corresponding data point in the unorganized point cloud, such that the spatial coordinates of the given data point and the spatial coordinates of the corresponding data point are identical.

9. The method of claim 8, wherein:
(a) a first set of one or more material properties is associated with the given data point in the spatial data structure;
(b) a second set of one or more material properties is associated with the corresponding data point in the unorganized point cloud; and
(c) the first and second sets of material properties are identical, including identical in type and identical in state or value.

10. The method of claim 1, wherein data generated during step (c) of claim 1 while processing a given layer is deleted before performing step (c) of claim 1 for another layer.

11. A system comprising
(a) a multi-material 3D printer; and
(b) one or more non-transitory computer readable media, with instructions encoded thereon that instruct one or more computers to execute an algorithm that includes the following steps:
  (i) converting an unorganized point cloud into a spatial data structure, such that data points in the spatial data structure are not constrained to be located at grid points of a regularly-spaced 3D grid,
  (ii) computationally dividing the spatial data structure into layers, and computationally dividing each of the layers into pixels,
  (iii) performing, for each respective pixel in each respective layer
    (A) a spatial query to try to find a set of data points, which set of points consists of not more than a specified number of points that are nearest in distance to the respective pixel and are within a specified distance threshold from the respective pixel, and
    (B) computations to determine a material mixing ratio for the respective pixel,
  (iv) calculating, for each respective layer, a set of binary raster files that encode material deposition instructions, and
  (v) generating, based on binary raster files for the layers, printer instructions for the multi-material 3D printer to physically fabricate a physical object;
wherein the algorithm does not include, as part of specific steps, generating any boundary representation of the object or generating any 3D voxel representation of the object, the specific steps being the converting, the dividing into layers, the dividing into pixels, and the performing.

12. The system of claim 11, wherein, for each given data point in the spatial data structure, respectively, there is a corresponding data point in the unorganized point cloud, such that the spatial coordinates of the given data point and the spatial coordinates of the corresponding data point are identical.

13. The system of claim 12, wherein:
(a) a first set of one or more material properties is associated with the given data point in the spatial data structure;
(b) a second set of one or more material properties is associated with the corresponding data point in the unorganized point cloud; and
(c) the first and second sets of material properties are identical, including identical in type and identical in state or value.

14. The system of claim 11, wherein:
(a) a radius is associated with each point in the point cloud; and
(b) a given point is not eligible to be included in the set of points returned by a spatial query for a given pixel, if the distance between the given point and the given pixel exceeds the radius.

* * * * *